United States Patent
Evans et al.

(10) Patent No.: US 12,194,843 B2
(45) Date of Patent: Jan. 14, 2025

(54) POWERED VEHICLE

(71) Applicant: Polaris Industries Inc., Medina, MN (US)

(72) Inventors: Bryce R. Evans, Greenbush, MN (US); William B. Rodriguez, Roseau, MN (US); Scott D. Taylor, Blaine, MN (US); Joel B. Kelso, Star Prairie, WI (US); Michael J. Hanten, Delano, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 17/818,254

(22) Filed: Aug. 8, 2022

(65) Prior Publication Data
US 2022/0371684 A1 Nov. 24, 2022

Related U.S. Application Data

(63) Continuation of application No. 16/207,945, filed on Dec. 3, 2018, now Pat. No. 11,420,516.

(51) Int. Cl.
*B60K 17/342* (2006.01)
*B60K 5/00* (2006.01)
(Continued)

(52) U.S. Cl.
CPC ........ *B60K 17/342* (2013.01); *B60K 15/0406* (2013.01); *B62J 9/14* (2020.02);
(Continued)

(58) Field of Classification Search
CPC ..... B62J 9/14; B62J 35/00; B62J 43/00; B62J 45/00; B62K 23/06; B62K 23/04; B60F 5/003; B60K 11/04; B60K 11/06; B60K 11/08; B60K 13/02; B60K 2005/003; B60K 17/342; B60K 15/0406; B60Y 2200/124; B60Y 2200/20; B60Y 2300/19;
(Continued)

(56) References Cited

U.S. PATENT DOCUMENTS

| 4,220,124 A | 9/1980 | Morris et al. |
| 4,351,279 A | 9/1982 | Wick |

(Continued)

FOREIGN PATENT DOCUMENTS

| CN | 104943799 A | 9/2015 |
| CN | 205059904 U | 3/2016 |

(Continued)

OTHER PUBLICATIONS

International Preliminary Report on Patentability corresponding to PCT/US2019/063779, dated Jun. 8, 2021, with Written Opinion of the International Searching Authority EPO/ISA.
(Continued)

*Primary Examiner* — Jacob D Knutson
*Assistant Examiner* — Felicia L. Brittman-Alabi
(74) *Attorney, Agent, or Firm* — Harness, Dickey & Pierce, P.L.C.

(57) ABSTRACT

Disclosed is a wheeled vehicle. The wheeled vehicle includes various features for operation by a rider, such as a throttle actuation assembly and various components for operation and manipulation of the vehicle.

9 Claims, 18 Drawing Sheets

(51) Int. Cl.
| | |
|---|---|
| *B60K 11/04* | (2006.01) |
| *B60K 11/06* | (2006.01) |
| *B60K 11/08* | (2006.01) |
| *B60K 15/04* | (2006.01) |
| *B62J 9/14* | (2020.01) |
| *B62J 35/00* | (2006.01) |
| *B62J 43/00* | (2020.01) |
| *B62J 45/00* | (2020.01) |
| *B62K 23/06* | (2006.01) |
| *F02D 11/02* | (2006.01) |
| *B60F 5/00* | (2006.01) |
| *B60K 13/02* | (2006.01) |
| *F02D 11/10* | (2006.01) |

(52) U.S. Cl.
CPC ............... *B62J 35/00* (2013.01); *B62J 43/00* (2020.02); *B62J 45/00* (2020.02); *B62K 23/06* (2013.01); *F02D 11/02* (2013.01); *B60F 5/003* (2013.01); *B60K 2005/003* (2013.01); *B60K 11/04* (2013.01); *B60K 11/06* (2013.01); *B60K 11/08* (2013.01); *B60K 13/02* (2013.01); *B60Y 2200/124* (2013.01); *B60Y 2200/20* (2013.01); *B60Y 2300/19* (2013.01); *F02D 11/10* (2013.01)

(58) Field of Classification Search
CPC .. F02D 11/02; F02D 11/10; F02D 2009/0269; F02D 9/1065; F02D 11/04
USPC .......................................................... 180/239
See application file for complete search history.

(56) References Cited

U.S. PATENT DOCUMENTS

| | | | |
|---|---|---|---|
| 5,660,206 A * | 8/1997 | Neal | ..................... F16K 15/148 |
| | | | 137/854 |
| 9,944,177 B2 | 4/2018 | Fischer et al. | |
| 11,124,061 B2* | 9/2021 | Kamiyama | ........ B60K 15/0406 |
| 2003/0114270 A1 | 6/2003 | Wuertz et al. | |
| 2008/0196532 A1 | 8/2008 | Fowler | |
| 2009/0071437 A1* | 3/2009 | Samoto | ................. F02D 9/1065 |
| | | | 123/399 |
| 2014/0290787 A1 | 10/2014 | McAvey | |
| 2015/0183321 A1 | 7/2015 | Lefebvre et al. | |
| 2020/0171942 A1 | 6/2020 | Evans et al. | |

FOREIGN PATENT DOCUMENTS

| | | |
|---|---|---|
| DE | 202007013865 U1 | 12/2007 |
| WO | 2020117602 A2 | 6/2020 |

OTHER PUBLICATIONS

Canadian Office Action dated Sep. 14, 2022 corresponding to Canadian Application No. 3,121,487.
Polaris RZR 170 Owner's Manual for Maintenance and Safety. Pub. 2017, 103 pages.
International Search Report and Written Opinion mailed on Jun. 26, 2020 in corresponding application No. PCT/US2019/063779.
Office Action mailed Jan. 24, 2022, in corresponding Chinese Application No. 201980080247.X.
Mexican First Office Action for related Mexican Patent Application No. MX/a/2021/006511 dated Oct. 31, 2024, 10 pages.

* cited by examiner

POWERED VEHICLE

CROSS-REFERENCE TO RELATED APPLICATIONS

This application is a continuation of U.S. patent application Ser. No. 16/207,945, filed Dec. 3, 2018. The entire disclosure(s) of (each of) the above application(s) is (are) incorporated herein by reference.

FIELD

The subject application relates to a wheeled vehicle, in particularly to an All-Terrain Vehicle.

BACKGROUND

This section provides background information related to the present disclosure which is not necessarily prior art.

A vehicle may be used to travel or traverse various surfaces or areas. For example, a street or wheeled vehicle may be used to traverse or move items or individuals on a paved or hard surface. Various vehicles, however, may include features or elements that allow for traversing more rugged terrain, such as areas not including paved or hard-packed roads.

SUMMARY

This section provides a general summary of the disclosure, and is not a comprehensive disclosure of its full scope or all of its features.

An All-Terrain Vehicle (ATV) may be used to travel over land where maintained roads, such as hard-packed or paved roads, are not present. ATV's may include various features and elements that allow for ease of travel over areas without paved roads. Such features may include long suspension travel, soft or compliant suspension, ease of mounting and dismounting the vehicle, and the like. Further, the vehicle may include enclosed and unenclosed passenger and storage areas and may further include various features or items that are multi-purpose.

The ATV may further include features that assist in allowing a younger rider or inexperienced rider a superior ride experience. For example, a throttle assembly may be adjustable and/or pliable to select a maximum speed and/or pressure applied to a user. The ATV may include multi-purpose elements that can be used for various purposes such as for seating, storage, access to internal components, or the like. Further, the ATV may include access panels that allow for ease of access to internal components or assemblies to assist in maximizing efficiency of repairs and/or maintenance during use.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
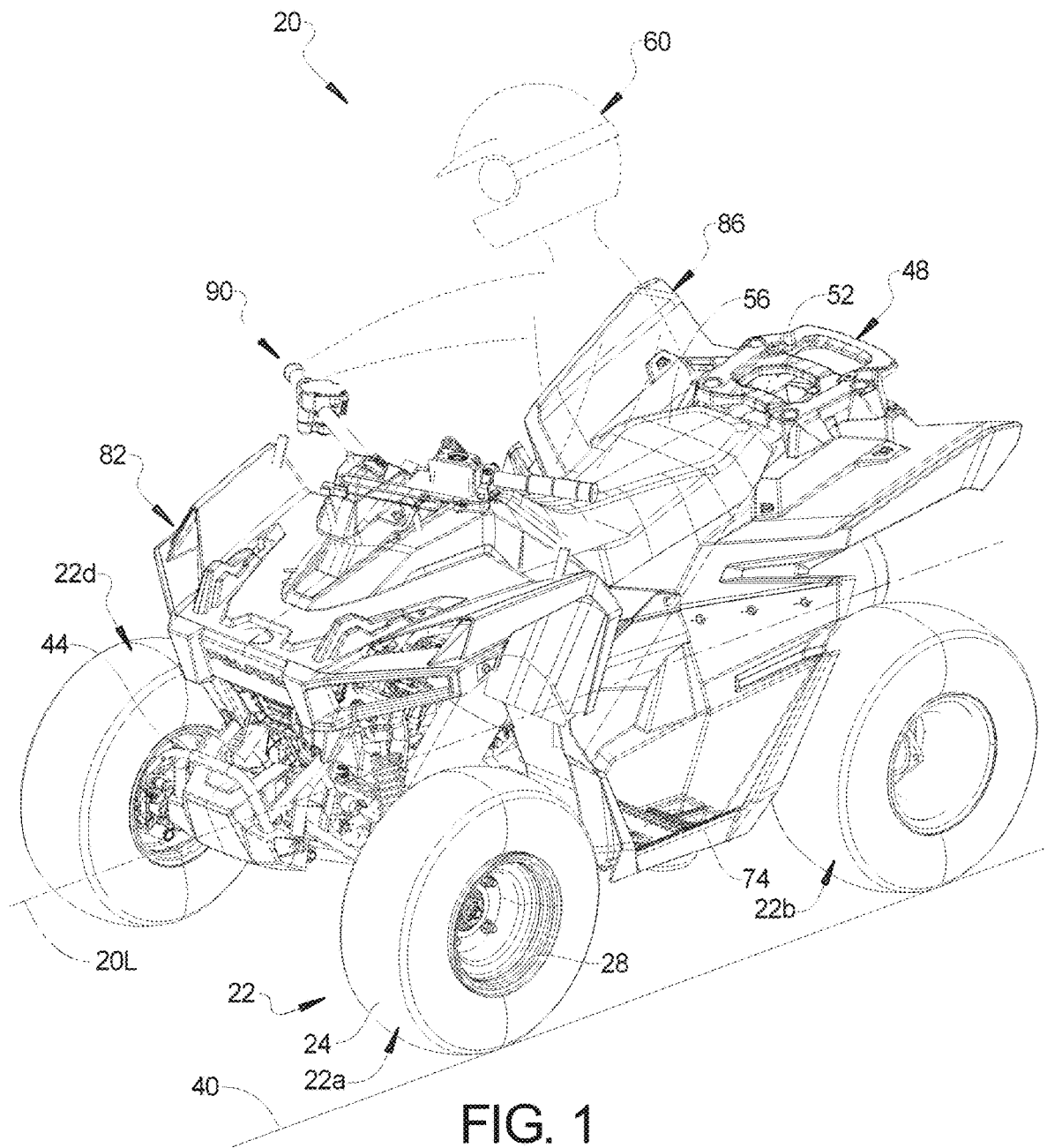
FIG. 1 is a perspective environmental view of an wheeled vehicle, according to various embodiments.

Example embodiments will now be described more fully with reference to the accompanying drawings.

With initial reference to FIG. 1-FIG. 6 an All-Terrain Vehicle (ATV) 20 is illustrated. The ATV 20 includes various components and portions that may be viewed from an exterior of the ATV 20. For example, the ATV 20 may include ground engaging members that may move, such as one or more wheel assemblies 22 (herein also referred to individually as the wheel assembly 22 augmented by a lowercase letter a, b, c, or d). The wheel assemblies 22 may include various components, such as a tire 24 that may be mounted onto a rim or wheel member 28. The tire 24 may be mounted to the rim 28 in an appropriate manner, such as with a bead, compression or bead-lock system, or other appropriate system. Again, it is understood that each of the wheel assemblies 22 may be substantially similar, including the tire member 22 and rim member 28 (herein individual parts may be tire 24 augmented by a lowercase letter and rim member 28 augmented by a lowercase letter). Generally the tire 24 may have an appropriate diameter, such as about 20 inches to about 30 inches (about 50 cm to about 76 cm). In various embodiments, however, the wheel assemblies 22 may be replaced by one or more track assemblies, non-pneumatic wheels, or other appropriate ground engaging members.

Figure 2:
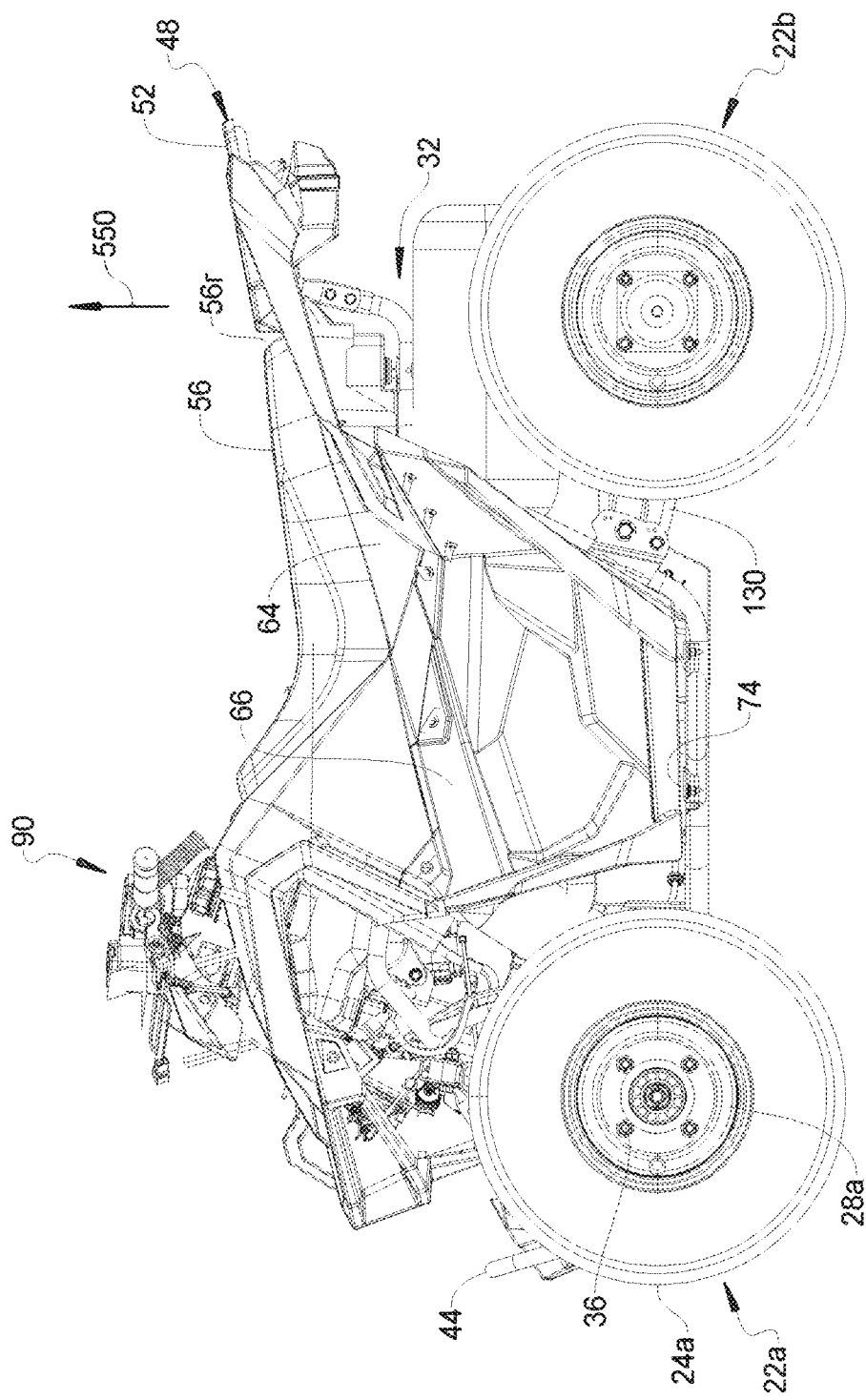
FIG. 2 is a side elevation view of the vehicle of FIG. 1.

The ATV 20 may be held or have an exterior body members, as discussed further herein, mounted to a frame assembly 32. The frame assembly 32 may include various portions, such as hubs to which the rims 28 are mounted. For example, as illustrated in FIG. 2, the wheel assembly 24a may have the rim 28a mounted to a hub by one or more fixation members 36 that may be fixed to studs or other appropriate mounting features to connect the wheel assembly 22a to the frame assembly 32. The wheel assembly 22a, however, may be mounted to the hub assembly in an appropriate manner to allow the wheel assembly 22a to rotate. Generally, the ATV 20 may be two-wheel drive (e.g. by driving the rear wheels including a rear-wheel assembly 22b) or four-wheel drive where all of the wheel assemblies 22 are driven substantially simultaneously or selectively, such as with a differential assembly.

The ATV 20, which may also be referred to as a vehicle 20, rides or moves on the ground engaging assemblies 22 on a ground or surface 40. Generally, the ATV 20 extends between a forward portion or bumper 44 and a rearward portion or bumper, which may include a luggage rack 48. In various embodiments, a luggage rack 52 may be mounted rearward or at a seat rear portion 56r of a seat assembly 56. The vehicle 20, therefore, may extend along a center line 201 and generally may have a transmission to move forward and reverse along the center line 201. A rider 60 may sit on the seat 56 which may be placed on one or more body panels, such as a main or central body panel or body member 64. The rider 60 may further place their feet alongside body panels, such as a left-side body panel 66 and a right-side body panel 70 in foot wells, such as a left foot well 74 and a right foot well 78. The foot wells 74, 78 may include various components, and may include a floor portion that is solid or open. In various embodiments the foot wells 74, 78 may include an open structure to allow debris, such as water or mud, to easily drain or empty from the foot wells 74, 78.

The body panels may further include a hood assembly 82 which may include front left and right wheel wells. A cargo or rear body panel area 86 may include rear wheel wells and/or an area to mount the luggage rack 52.

The rider 60 may engage a steering assembly 90 with hands or other operating members. The steering assembly 90 may include a handlebar 94 with handle grips 96, 98 at terminal ends of the handlebar 94. Various controls may also be provided on the handle bar 94 including a clutch or brake assembly 102 and a throttle actuation assembly 108. Other controls may also include foot controls, such as a foot brake 112. The foot brake 112 may be placed in the foot well, such as the right foot well 78 or near the foot well 78.

Positioned below the body panel 64 may be various mechanical portions of the ATV 20 including an exhaust assembly, including a muffler or silencer 116, a battery assembly or member 120, and a motor assembly 126. The motor assembly 126 may power a drive assembly that drives a chain or other final drive system 130 to power the wheel assemblies, such as the rear-wheel assembly 22b. It is understood that the rear wheel assembly 22b may include the rear-wheel assembly 22b as a left rear-wheel assembly and a right-wheel assembly 22c. An axle or other assembly may connect the rear wheel assemblies 22b and 22c to be driven with the final drive chain 130. The motor 126 may be operated through the throttle assembly 108 by the rider 60, as discussed further herein. In various embodiments, the throttle actuation assembly 108 may send an electrical signal to a control unit (e.g. an engine control unit) and/or directly actuate a throttle body. Further, the steering assembly 90 may be turned or swiveled by the rider 60 to turn the front wheel assemblies, including the first wheel assembly 22a and the second front wheel assembly 22d.

Figure 5:
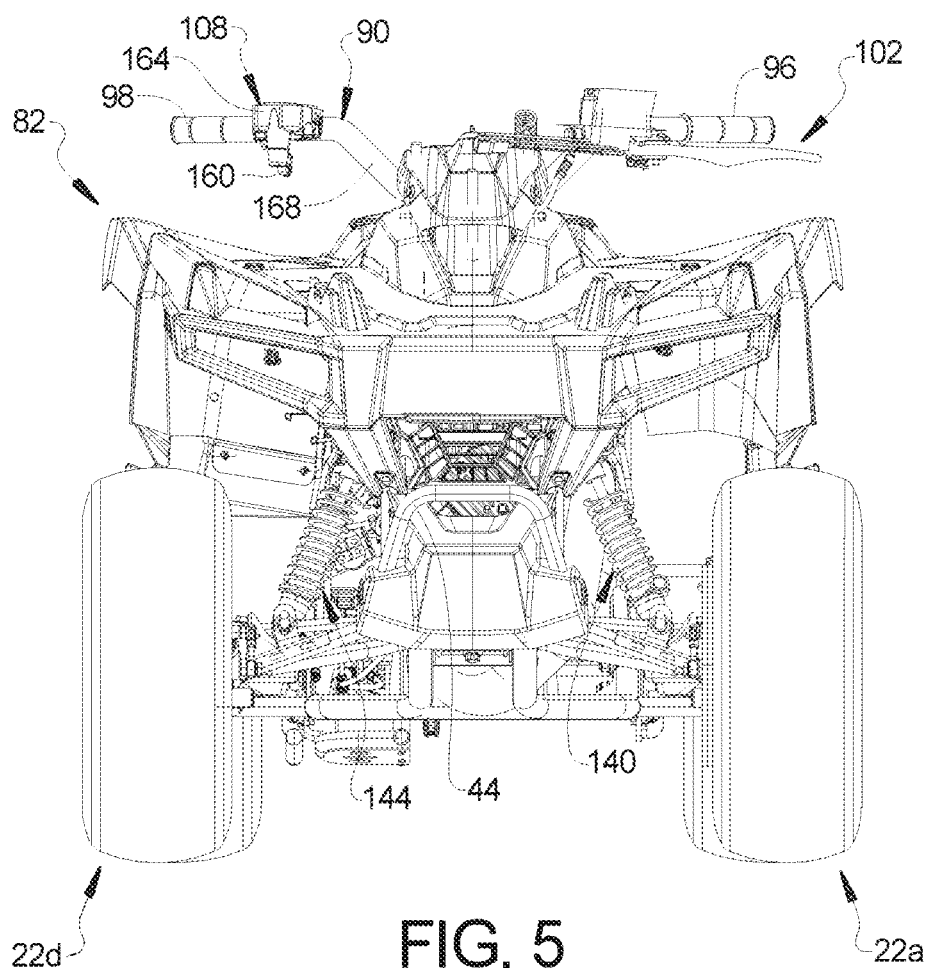
FIG. 5 is a front elevation view of the vehicle of FIG. 1.
Figure 6:
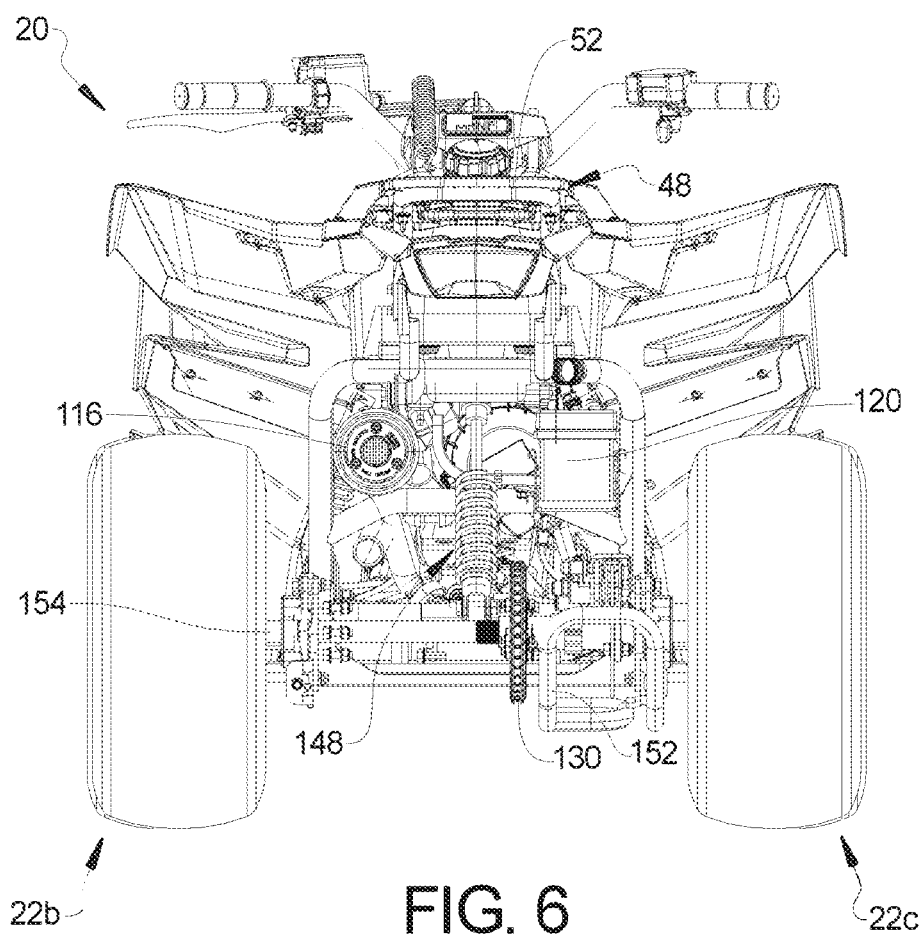
FIG. 6 is a rear elevation view of the vehicle of FIG. 1.

As illustrated in FIG. 5 and FIG. 6, a suspension assembly may also be provided with the ATV 20. In various embodiments the front wheels 22a and 22d may be suspended by independent suspension portions or assemblies, including a first suspension assembly 140 and a second suspension assembly 144. The suspension assemblies 140, 144 may extend from the frame assembly 32 to couplings near the wheel assemblies 22a and 22d. The suspension assemblies 140, 144 may be any appropriate suspension assembly, such as a coil over shock assembly. The ATV 20 may further include a rear suspension assembly. The rear suspension assembly may include a single shock or suspension member 148 that may extend from the frame assembly 32 to a rear suspension member or connection point 152 to which an axle 154 is rotatably mounted. Accordingly, the drive chain 130 may drive a gear at the axle 154 and the single suspension or dampening member 148 may connect to both of the rear wheel assemblies 22c and 22b. It is understood, however, that any appropriate suspension configuration may be provided with the ATV 20.

Further, the motor 126 may be operated with the throttle assembly 108 that includes a movable member that may also be referred to as a flipper 160. The flipper 160 may be rotatably mounted to a throttle assembly body 164 of the throttle assembly 108. The throttle assembly 108 may be an electrical throttle assembly where a signal, such as an analog or digital signal is transmitted by a throttle cable 168 to the motor 126 to operate a throttle of the motor 126. It is understood, however, that the throttle cable 168 may also be a manual or mechanical throttle cable (e.g. a braided wire) that may move when the flipper 160 is moved by the rider 60. Operation of the throttle assembly 108 may alter the speed of the motor 126 and thereby alter the speed of the final drive chain 130 and the rear wheels 22c and 22b. As discussed above, however, the ATV 20 may also be a four-wheel drive system where changing the throttle position will also change the speed of all four wheels, such as changing the speed substantially simultaneously of all four wheels.

In various embodiments, the throttle assembly 108 including the flipper 160 and the throttle assembly body 164, may have a control or limit portion that allows a user or supervisor to limit the amount of movement of the throttle flipper 160. In various embodiments, a throttle limiting screw 180 may be used. As illustrated in FIG. 6A and FIG. 6B, the throttle assembly body 164 may include a casing 184 having an outer wall 186. The screw 180 may pass through a bore 190 formed in the wall 186 of the casing 184. The screw 180 may be moved in a direction generally along an axis 192 of the screw 180 to move into a body cavity 196 defined by the casing 184 or out of the cavity 196. The screw 180 may be moved relative to the casing 184 such as by threads formed in the bore 190, or other augmented or second member, such as a nut 200 that is threaded over the screw 180. The screw 180, therefore, may be moved and fixed relative to the wall 186 of the throttle casing 184.

The screw 180 includes a contact portion 204. The contact portion 204 may include a terminal end 208. The end 208 may be a distance from an end of the screw 180 or formed at an end of the screw 180. Thus, the contact portion 204 may be formed with the screw 180 or connected thereto. Further, the contact portion 204 may be a terminal portion of the screw 180, as discussed further herein.

Regardless, upon movement of the flipper 160, an internal throttle member 212 moves due to an axle or spindle 216 that extends from the flipper 160 that is exterior to the throttle casing 184 to the internal throttle member 212. Accordingly, movement of the flipper 160 moves the internal throttle member 212. Movement of the internal member 212 may actuate or move the throttle cable 168. Movement of the cable 168 may be due to a mechanical or cable connection 220 from the cable 168 to the internal member 212. As discussed above, however, the throttle assembly 108 may, alternatively or in addition to the physical cable, include electronic throttle signals such that the movement of the flipper 160 does not require movement of the physical throttle cable 168. In an electronic throttle, a signal to may be sent to the engine or a throttle body actuator, such as through an engine control unit (ECU), or directly to a throttle body.

Nevertheless, due to movement of the internal throttle member 212, in light of movement of the flipper 160, the engine 126 may change or alter speed. Accordingly, movement of the flipper 160 and the associated respective movement of the internal member 212 may be and generally is directly associated with the speed of the engine 126. Contact of the internal throttle portion 212 with the contact portion 204 of the screw 180 may limit movement of the internal member 212.

Figure 7A:
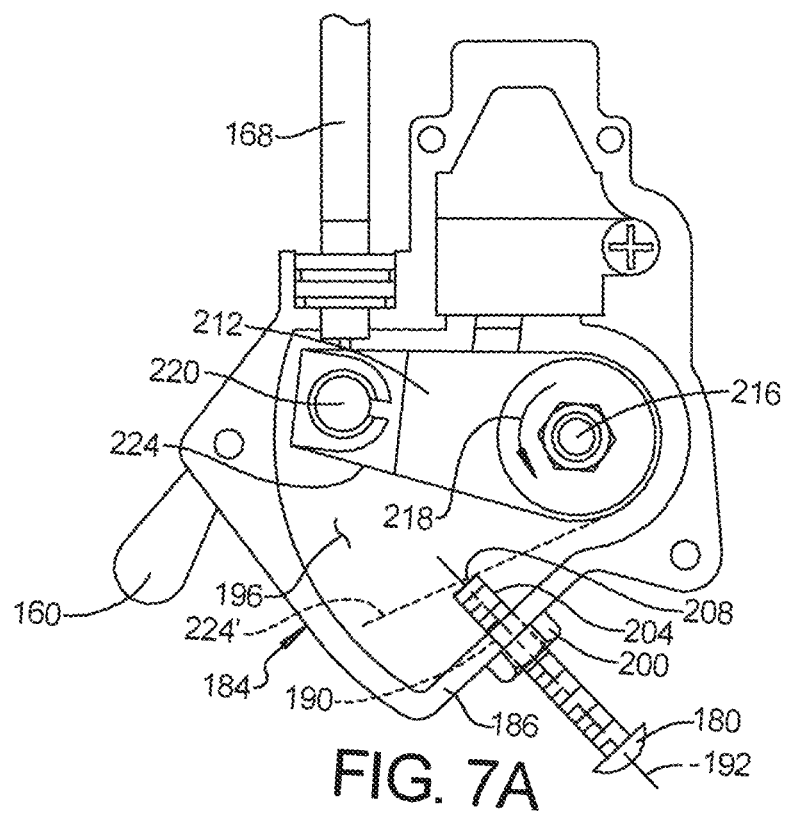
FIG. 7A is a detailed view of a throttle actuation assembly, according to various embodiments.

As illustrated in FIG. 7A, in a no-throttle position, the internal throttle member 212 may have a first edge 224 that is spaced a distance from the end 208. Upon movement of the flipper 160, however, the internal member 212 may rotate generally in the direction of arrow 228. After a certain amount of movement, the edge 224 may move to a second position 224' that may be in contact with the end 208. Accordingly, movement of the end 208 of the screw 180 may be used to select a maximum amount of movement of the internal throttle member 212. Thus, the screw 180 may limit the amount of movement of the internal throttle member 212 and the respective movement of the throttle cable 168. Thus, the screw 180 may allow for a maximum throttle and/or a maximum limited throttle.

The contact portion 204 may be formed integrally with the screw 180 or may be a separate member attached to the screw 180. In various embodiments, for example, the screw 180 may be formed as a single piece and entirely of a pliable material, such as a rubber or elastomer. The pliable material may move or compress under a selected load, such as a load due to application of a force on the flipper 160 by the rider 60.

Further, however, the screw 180 may be formed of at least two portions. The contact portion 204 may be separate from a further portion 181 of the screw 180. The contact portion 204 may be formed of a different material than the second screw portion 181. The contact portion 204, for example, may be formed as a spring (e.g. a wound metal spring), or biasing member (e.g. a soft rubber or elastomer material (e.g. silicone rubber)), or other appropriate material.

Regardless of the specific construct of the screw 180, when the edge 224 moves to the contact position 224', the end 208 of the contact portion 204 contacts the internal member 212. When the contact portion 204 is formed of a soft and/or pliable material, a hard contact is avoided and a soft or pliant contact is achieved. The internal member 212 may be formed of a hard or substantially ridged material, such as a metal or metal alloy, or thermoplastic, and the contact portion 204 may be formed of a soft or pliant material, such as those discussed above. Thus, pressing on the flipper 160 allows for a soft or non-rigid contact of the internal member 212 with the contact portion 204. Regardless, the screw 180 may be used to alter or limit the amount of travel of the internal member 212 of the throttle assembly 108 and, therefore, movement of the flipper 160.

Figure 7B:
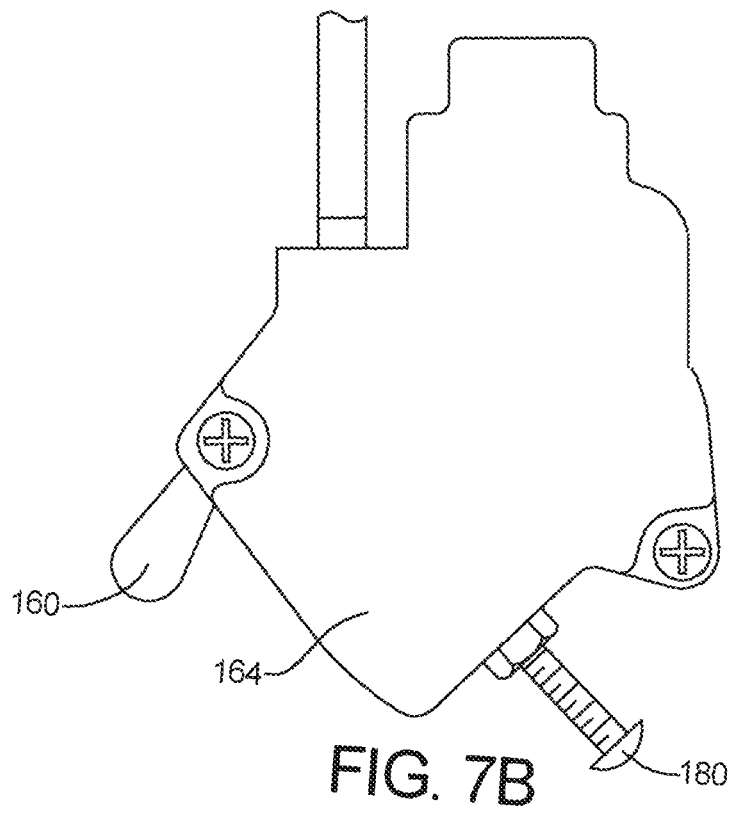
FIG. 7B is an internal view of the throttle actuation assembly of FIG. 7A.

In various embodiments, with reference to FIG. 7A and FIG. 7B, the throttle assembly 108 that includes the flipper 160 may include a further throttle limiting or adjustment assembly, in addition to or in the alternative to the screw 180. As discussed above, the flipper 160 may be moved to move the internal throttle assembly member 212. The internal throttle assembly member 212 may be engaged by the flipper 160 through the central axle member 216. The axle member 216 may pass through a bore 238 of a shaft 240 that extends from the casing 184, such as through an extension 244.

With further reference to FIG. 8A, FIG. 8B, FIG. 9A, FIG. 9B, and FIG. 10, the shaft 240 may include an end, such as a terminal end 248, that has a step or shoulder 252. At the shoulder 252 may be one or more splines or projections, such as a first spline 256 and a second spline 258. It is understood that the splines 256, 258 may be the same or similar dimension or may be different dimensions, such as in a keyed configuration. It is further understood that only a single spline may be selected or provided on the shaft 240. Nevertheless, the splines 256, 258 may engage one or more detents 262 of the flipper 160. The detents 262 may be formed or viewed as depressions or indents and/or the edges formed relative to the depressions. The flipper 160 may include or define a central passage 266 and a plurality of the detents may be formed into a body 268 of the flipper 160 extending from the passage 266. The detents 262 may include a first set of detents 274 and a second set of detents 278. As discussed above, the projections or splines 256, 258 may be of different sizes and the sets of depressions 274, 278 may be sized in concert such that a keyed configuration or fit of the flipper 160 relative to the shaft 240 is produced.

In various embodiments, the first set of splines 274 may be set a certain distance apart, such as a fixed distance and/or rotational distance 284. The distance 284 may be any appropriate distance such as about 5 degrees to about 25 degrees. It is understood that the distance 284 may be selected based upon the number of detents in the first set 274 and/or a desired selection of movement between the flipper 160 and the shaft 240. Similarly, a distance 288 may be formed between the set of detents 278. Generally, the distance 288 will be substantially identical to the distance 284 save for a variation due to the size of the respective detent sets 274, 278 relative to the projections 256, 258. Accordingly, if the width or size of the detents in the second detent set is larger than the size of the detents in the first detent set 274, the distance 288 may be smaller than the distance 284 while still allowing for a similar or identical movement of the flipper 160 relative to the shaft 240.

The flipper 160 may include the central passage 266 through which the axle member 216 may pass. A head or expanded region 296 of the shaft 216 may engage a surface 300 adjacent to the passage 266 to hold the flipper 160 relative to the shaft 240. The flipper 160 may be held relative to the shaft 240 due at least in part to a biasing member 304 positioned between the head or expanded portion 296 and the surface 300. The biasing member 304 may be any appropriate member, such as a spring member, a compliant material member (e.g. rubber, silicone rubber, etc.), or other appropriate material. Accordingly, the flipper 160 may be held relative to the shaft 240 due to the placement of the axle member 216 through the bore 238 in the shaft 240 and the passage 266 and the engagement of the biasing member 304 against the surface 300 of the flipper 160.

In a selected operation a user, such as the rider 60, or a supervisor of the rider 60, may move or rotate the flipper 160 relative to the shaft 240. The flipper 160 may be moved against the biasing member 304, such as generally in the direction of arrow 310. The flipper 160 may be moved enough to move the detents 262 off of the projections 256, 258. The flipper 160 may then be freely rotated relative to the shaft 240, such as generally in the direction of the double headed arrow 314. Rotation of the flipper 160 relative to the shaft 240 may position the flipper 160 at a different position relative to the internal member 212.

Once a selected orientation of the flipper 160 is made relative to the shaft 240 the flipper 160 may be released and allowed to move into engagement between the projections 256, 258 and the detents 262. When the flipper 160 is released, the biasing member 304 is allowed to bias the flipper 160 generally in the direction of arrow 318. Accordingly, the flipper 160 may be moved relative to the shaft 240 in a rotational manner, such as around the shaft 240 and the axle 216, and the biasing member 304 may hold the flipper 160 relative to the shaft 240 (i.e. in an axial direction) during operation of the ATV 20.

Figure 8A:
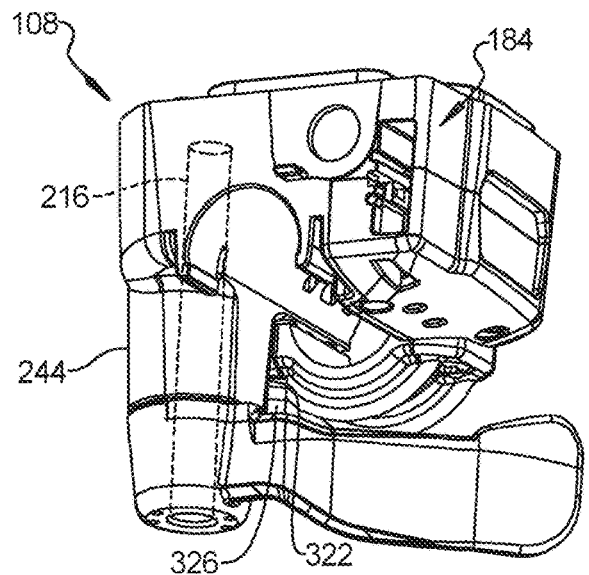
FIG. 8A is a throttle actuation assembly, according to various embodiments.
Figure 8B:
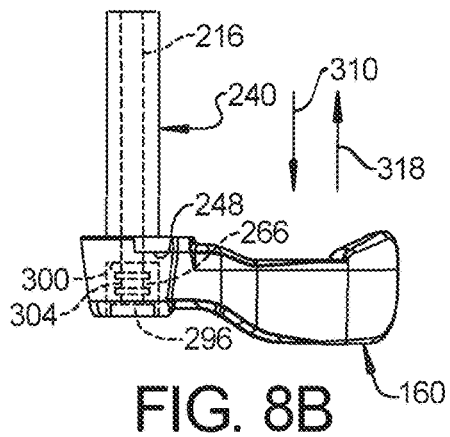
FIG. 8B is a detailed view of a flipper assembly.
Figure 9A:
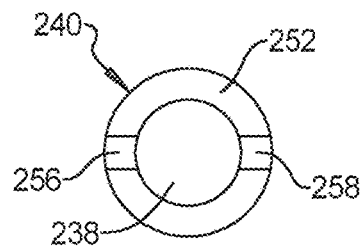
FIG. 9A is a detailed view of an end of a spindle.
Figure 9B:
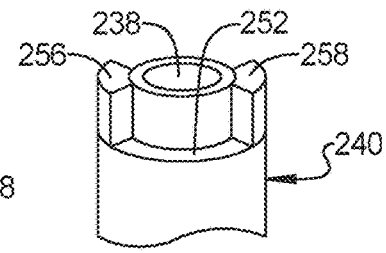
FIG. 9B is a perspective view of an end of a spindle.
Figure 10:
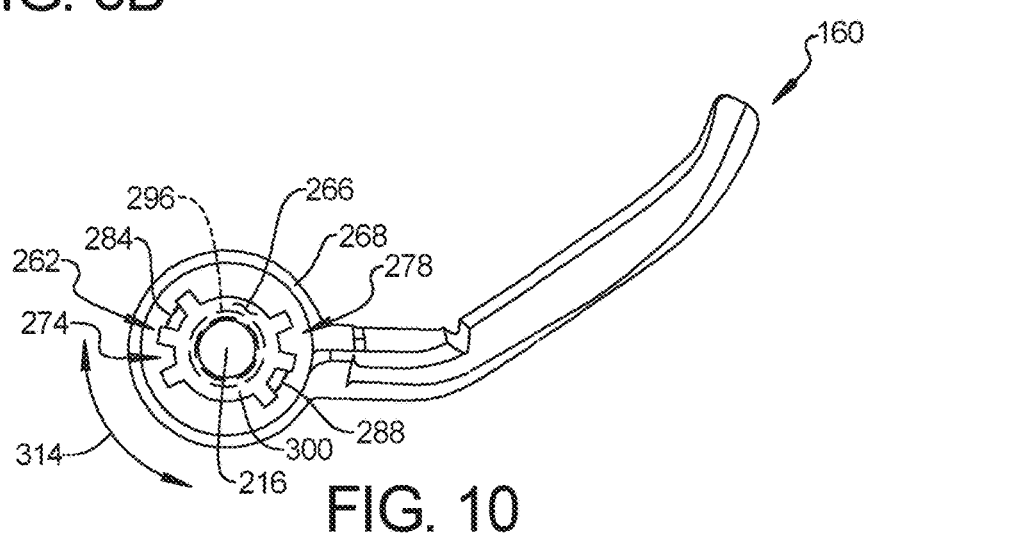
FIG. 10 is a detailed plan view of a flipper.
Figure 11:
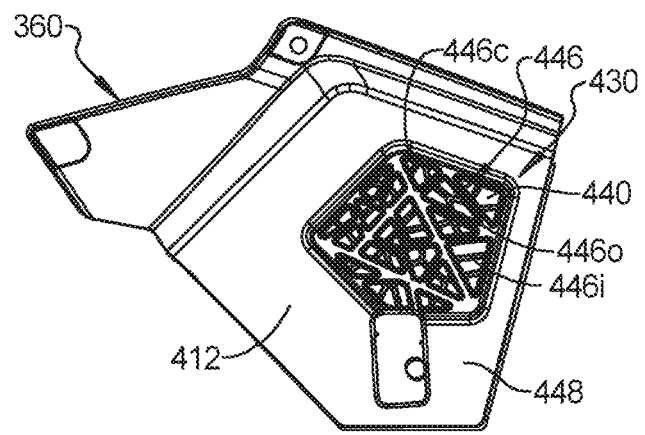
FIG. 11 is a front plan view of an access panel, according to various embodiments.
Figure 12:
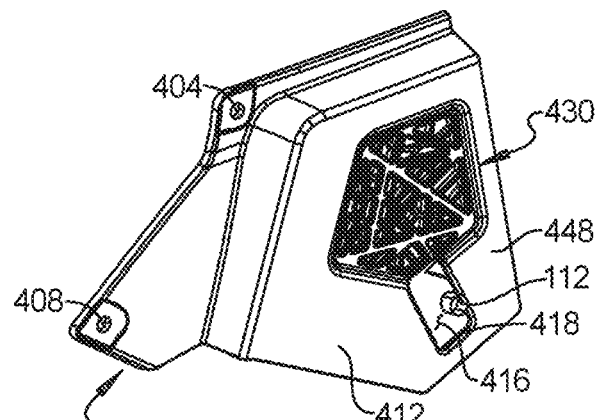
FIG. 12 is a perspective view of the access panel of FIG. 11.
Figure 13:
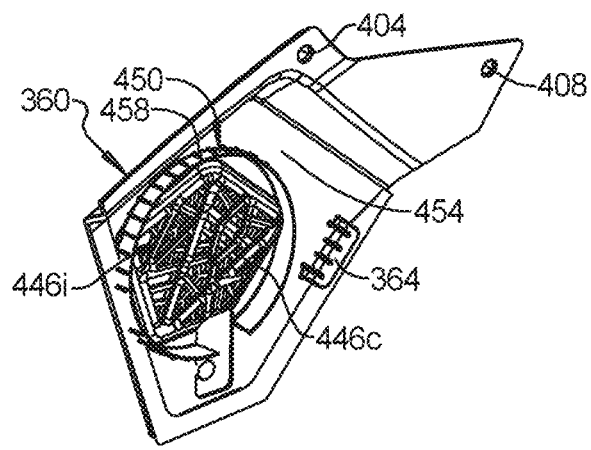
FIG. 13 is a rear perspective view of the access panel of FIG. 11.

With continuing reference to FIG. 8A, as discussed above the flipper 160 may move relative to the throttle assembly 108, including the casing 184. Movement of the flipper 160 moves the internal member 212 to operate the throttle of the motor 126. Thus, setting or fixing the flipper 160 at selected different orientations relative to the internal member 212 may adjust or limit the amount of movement that the flipper 160 may move the internal member 212 during a full amount of travel of the flipper 160. In various embodiments, the flipper 160 may engage a STOP 322, such as with a projection 326 on the flipper 160. The STOP 322 may extend from the projection or portion 244 that is fixed relative to the body 184. The projection 326 on the flipper 160 engages the STOP 322 and stops movement of the flipper 160. Thus, rotating and fixing the flipper 160 closer to the STOP 322 limits the amount of travel of the flipper 160. Accordingly this, in turn, limits the amount of travel or movement of the internal member 212 and limits the throttle of the ATV 20.

According to various embodiments, the throttle assembly 108 may include various throttle limiting features. As discussed above, the screw 180 may be moved relative to the internal member 212 to eliminate movement of the internal member 212 by providing a STOP surface at different positions within the casing 184. In a similar and/or alternative manner, the flipper 160 may be moved relative to a STOP portion, such as the STOP 322, external to the body 184 to limit travel of the flipper 160 directly. Accordingly, limiting or selecting amount of throttle travel may be achieved through various selections, including one or more of the limiters discussed above.

Figure 3:
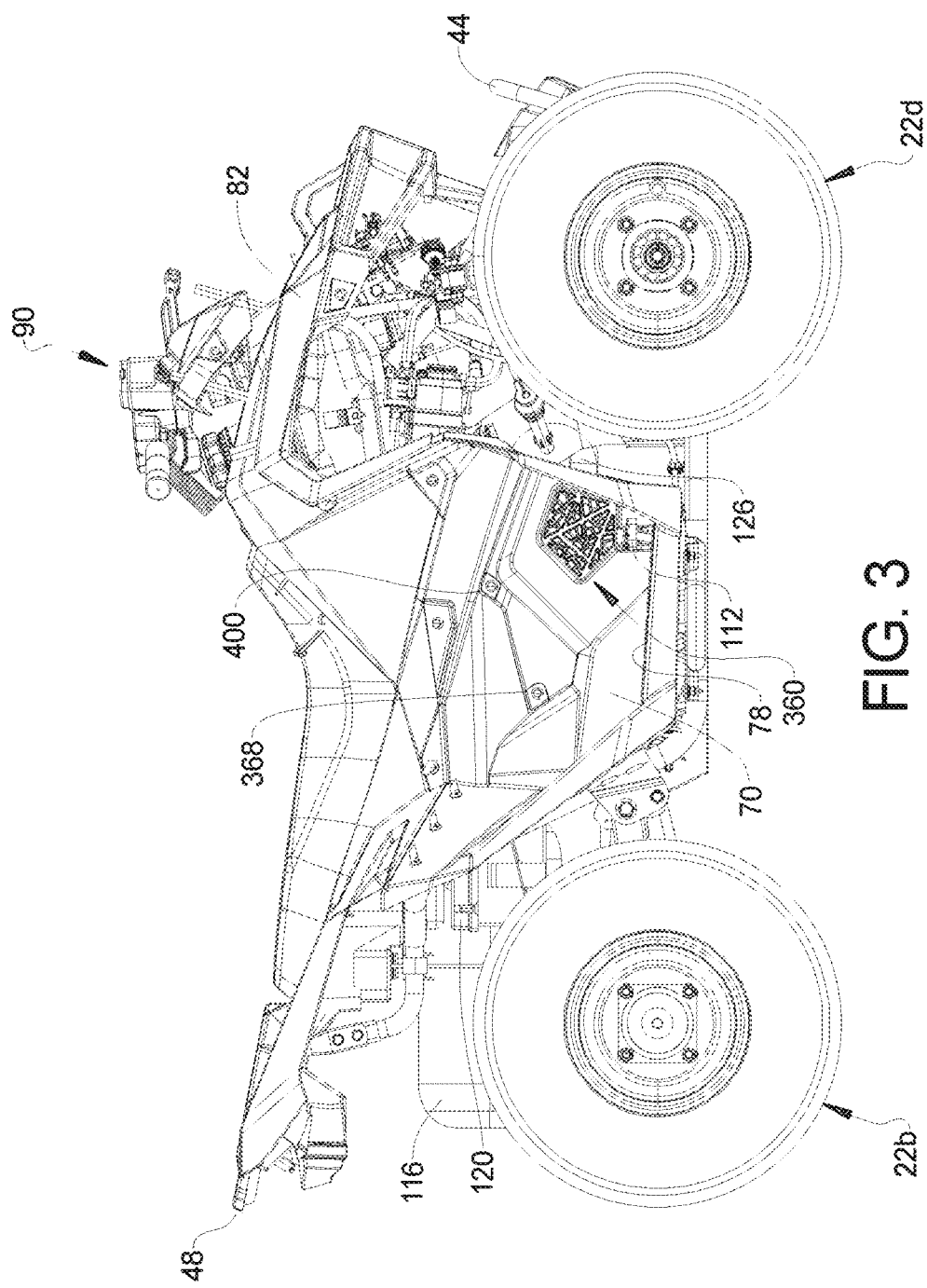
FIG. 3 is a right side elevation view of the vehicle of FIG. 1.

With continuing reference to FIG. 3 and additional reference to FIG. 11, FIG. 12, FIG. 13, FIG. 14, FIG. 15, and FIG. 16, the ATV 20 includes the motor 126, which may be an appropriate motor such as an internal combustion motor that is fueled by a combustible fluid, such as gasoline. The motor 126, may also have a cooling system which may include a liquid cooling system and/or an air cooling system. A fan portion or assembly may be provided to cool various components of the motor 126, such as a stator or alternator. Further, various service portions, such as an engine oil fill assembly, may be accessed through the body panels, such as the left body panel 70.

Figure 14:
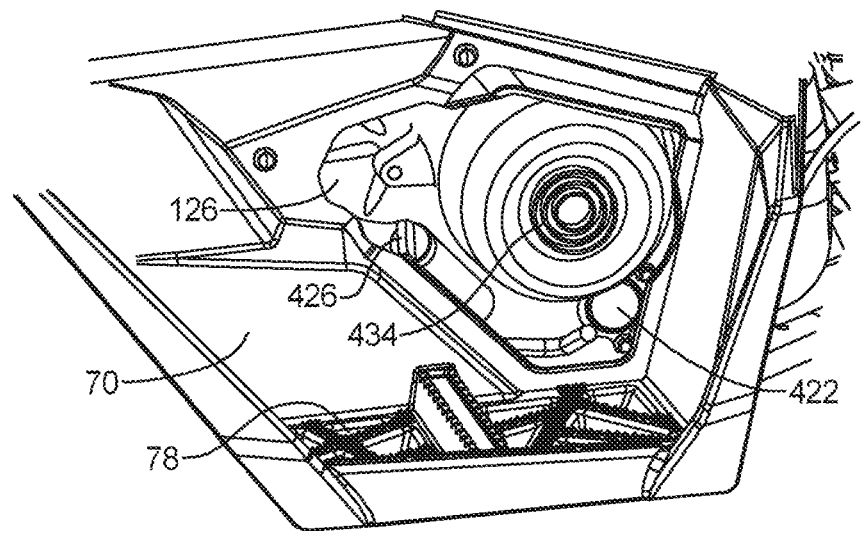
FIG. 14 is a detailed view of the vehicle of FIG. 1 with an access panel removed to expose an engine portion.

In various embodiments, the foot well 78 may have a body access panel 360. The access panel 360 may include various clip or projection portions, such as a projection 364, as illustrated in FIG. 14, that may engage a portion of the frame assembly 32 and/or other body panel portions. Further, one or more locking or engaging pins or bolts, such as a first locking pin 368 and a second locking pin 400, may pass through bores 404, 408, respectively, formed through the access panel 360. The access panel 360 may include a substantially solid outer surface or wall member 412 that may have a first passage or opening 416 defined by a wall 418 to allow access or passage for the brake 112. The foot brake 112 may be operated by a foot of the user or rider 60, and may be movable relative or through the wall 412 of the access panel 360.

When the access panel 360 is removed, as illustrated in FIG. 14, an oil filter access 422 is exposed as is an oil fill and/or dip stick channel 426. Removing the access panel 360, therefore, allows for replacing the oil filter through the oil filter access 422 and checking and/or filling oil to the engine 126. The access panel 360, however, includes a screened or perforated region 430. The screened region 430 allows openings for passage of air to a fan intake 434 of a fan assembly of the engine 126.

The fan intake 434 may be for any appropriate air intake, as discussed above, including for cooling a stator, alternator, or other appropriate system. The perforated region 430 may include openings or passages 440 that are formed or defined by or pass crossbars or reinforcement ridges 446. The crossbars or ridges 446 may be formed in a two-dimensional and/or three-dimensional pattern. For example, an outer most or nearest an outer surface 448 of the panel 412 may include outer bars 4460. Intermediate or middle bars 446i may also be present and formed in the perforated region 430. Finally, if selected, inner or close bars 446c may also be formed. It is understood that the bars 446 may be formed or provided in any appropriate manner or configuration, but that a three-dimensional configuration may allow for passage of air through the access panel 360 to the fan 434 while minimizing or eliminating passage of debris from exterior to the engine 126 through the fan assembly 434. Nevertheless the cross bars 446 may engage or stop debris and/or portions of the user 60, from entering the fan 434 while allowing access or passage of air to assist in cooling various portions of the engine 126.

Figure 15:
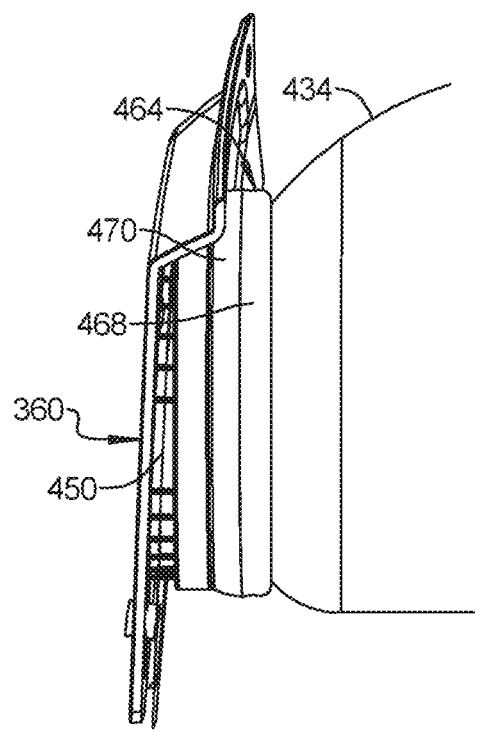
FIG. 15 is a detailed view of a sealing assembly onto a fan portion of the engine in FIG. 14.
Figure 16:
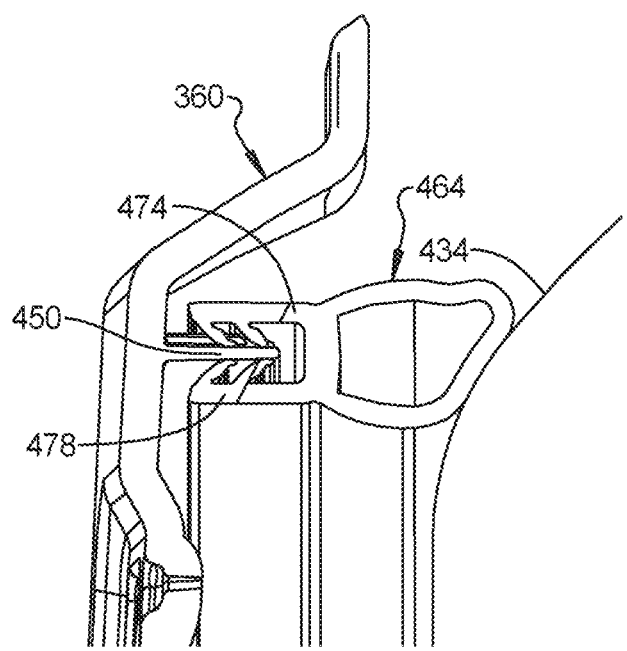
FIG. 16 is a partial cross-sectional view of the sealing assembly of FIG. 15 along line 16.

The access panel 360 may be sealed to and/or engage to the engine 126, such as near the fan assembly 434, at least in part with a sealing projection 450. The sealing projection 450 may extend from a rear surface 454 of the panel member 412. The sealing ring 450 may include various features, such as ribs or ridges 458 to assist in engaging and being fixed to a seal member 464, as illustrated in FIG. 15 and FIG. 16. The seal member 464 may be fixed or adhered to the fan assembly 434 and/or fixed to the sealing rib 450.

In various embodiments, for example, the sealing member 464 may be adhered to and/or fixed to the rib 450 and then compressed, so as to seal, against the fan assembly 434. The sealing member 464 may include a main body portion 468 and an engaging portion 470. The engaging portion 470 may include a first finger 474 and a second finger 478. The ring projection 450 may pass between the two fingers 474, 478 to fix and hold the sealing member 464 relative to the access panel 360. The sealing member 464 includes the main body 468 that may be bulbous or have a wall with an open interior to compress against and seal against the fan assembly 434. Accordingly, the air may pass through the ventilated or screened area 430 and into the fan assembly 434 without allowing material or air from around the engine 126 to enter the fan area 434. Thus, the air passing into the fan assembly 434 may be limited to the air that passes through the screen assembly 430. Material and debris may be limited or eliminated from engaging or passing into the fan assembly 434.

The ventilated or perforated area 430 may be formed in any appropriate manner. For example, as discussed above, the cross bars 446 may be molded with the panel assembly or member 360 in a selected molding process, such as injection molding, blow molding, or the like. In various embodiments, however, the screen assembly 430 may be formed as a separate member and fixed to the panel portion 412, such as with welding, adhesives, or the like. Providing the cross bars 446 in the two-dimensional and/or three-dimensional stacking, as discussed above, may allow for minimizing the transfer of material into the fan assembly 434 while maximizing air flow into the fan assembly 434. Further, the panel assembly 360 protects the engine 126 from intrusion from large objects or debris exterior to the panel 360, such as in the foot well 78 or from the ground surface 40.

Figure 17:
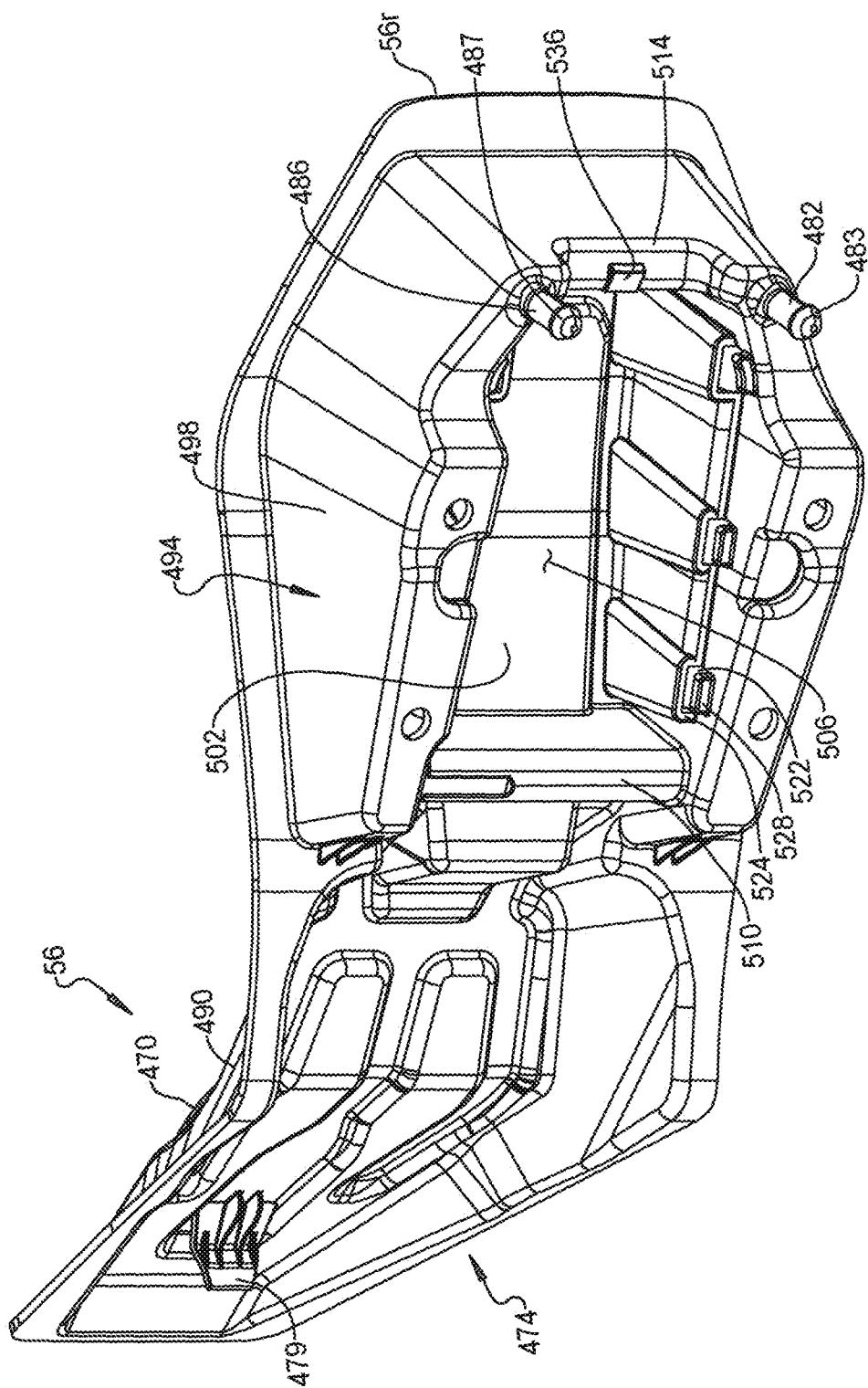
FIG. 17 is a bottom perspective view of a seat assembly with an exposed storage volume.
Figure 18:
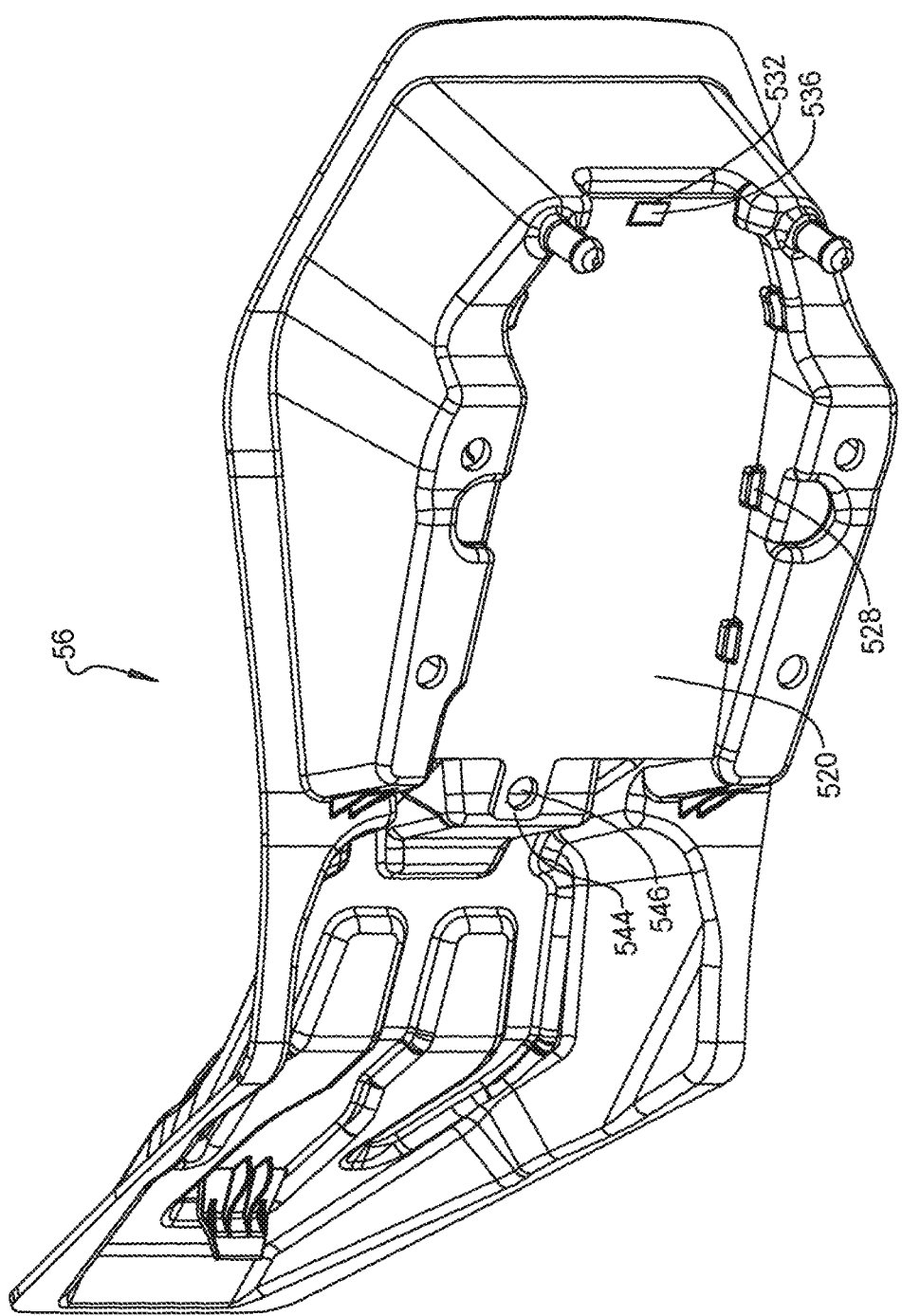
FIG. 18 is a bottom view of a seat assembly with a cover storage assembly.

A storage area may be included with the ATV 20 such as integrated into the seat assembly 56. The seat assembly 56, with continuing reference to FIG. 1 and additional reference to FIG. 17 and FIG. 18 includes a seating or sitting portion 470 and an under surface or engaging portion 474. The engaging portion 474 may include various engaging or locking features, such as a forward or front engagement clip or projection 479 and rear snap or locking pins or projections 482 and 486. Each of the projections 479, 482, 486 may engage various portions on the ATV 20 to hold the seat assembly 56 in a selected position. The seat assembly 56 may further include various features such as cushion or soft portion 490 and a frame assembly or ridged portion 494. The frame assembly 494 may include various portions, such as a raised wall or wall portion 498 that may extend from a surface or base 502.

The base 502 may define a first surface of a storage volume 506 that is defined by the exterior wall 498 and the base 502. A forward wall 510 and a rearward wall 514 may also define the volume 506. A movable panel or wall member 520 may be moved relative to the base 502 to enclose the volume 506. In various embodiments, one or more slots or tracks 522 may be formed between a lower surface or projection 524 and an upper or second projection 528. The track 522 may include a broken track and/or a continuous track. The panel member 520 may also be deformably flexible such that the panel 520 may be deformed and removed or placed into the track 522 without sliding.

In various embodiments, the upper or second projections 528 allow the lid or closure member 520 to be positioned relative to the volume 506. The lid 520 may further include a rear aperture 532 that may engage a retention member 536 that may include a projection or feature that extends from the rear wall 514. The lid member 520 may be moved relative to the track 522 with various portions, such as with an engagement or holding member or portion 544. The holding portion 544 may include a hole or through bore 546, that may allow for a finger or digit of a user to pass there through. As discussed above, the lid 520 need not be slid and may be deformed into the track 522 and then released and the lid 520 would release into the track 522.

Thus, the user 60 may engage the lid 520 and overcome a retention force of the projection 532 to remove the lid 520 from the seat assembly 56. By doing so, the user 60 may obtain or gain access to the storage volume 506 within the seat assembly 56. The lid member 520 allows for efficient access to the volume 506 defined by the seat assembly 56 without requiring additional locking or engagement portions. The lid member 520 may be formed of a compliant or flexible material that may be flexible to engage the projection 532 and then rebounding to allow the projection 536 to pass through the opening 532. Thus, the lid 520 may be held relative to the seat assembly 56 by allowing the projection 536 to pass through the opening 532.

In various embodiments the projections 482, 486 may engage passages or bores in the ATV 20 to hold the seat assembly 56 relative to the ATV 20. The projections 482, 486 may include shoulders or fingers 483, 487 that may be deformed or deform portions relative to the ATV 20 by pushing past respective projections or shoulders in the ATV 20 and allowing the seat assembly 56 to be locked or held relative to the ATV 20 during operation of the ATV 20. At a selected time, the seat assembly 56 may be removed from the ATV 20, such as by engaging or grasping a portion of the seat assembly 56, such as a rear portion 56r, thereof and pulling the rear portion 56r generally in the direction of arrow 550 (FIG. 1). By pulling the rear portion 56r in the direction of 550 the seat assembly 56 may be disengaged from the ATV 20 to allow access to the door or wall 520. The wall or cover 520 may then be removed to allow access to the storage volume 506.

As discussed above, the seat assembly 56 includes the projections 482, 486 that may be received within bores in the body panels. The bores may be surrounded or fitted with expanding grommet members 550, 554. The expanding grommet members may expand when engaged by the respective ridges or lips 483, 487 of the respective projections 482, 486. The grommets may expand and then compress to engage the projections 482, 486 to fix the seat assembly 56 relative to the ATV 20. The forward projection or finger 479 may be received in an undercut or ledge 558 near a forward portion of the ATV 20. Thus, the seat assembly 56, in various embodiments, may be installed by moving the seat assembly such that the projection 479 engages the ledge 558 and the seat assembly is then pressed down toward the body panels such that the projections 582, 586 are received and pushed into the grommets 550, 554.

Similarly, the seat assembly 56 may be removed in a substantially reverse manner. The user 60 may grasp the seat assembly 56, such as near a rear portion 56r of the seat assembly 56. The user 60 may then pull up or away from the body panel while grasping the rear of the seat assembly 56r. This may cause the projections 583, 587 to engage the grommets 550, 554. The force applied by the user 60 may cause the grommets 550, 554 to expand and allow the ridges or ledges 483, 487 to pass through the grommets 550, 554. Once released from the grommets 550, 554, the seat assembly 56 may be slid rearward, such as generally in the direction of arrow 562 and removed from the ATV 20. It is understood that any appropriate user may remove the seat 56, and the rider 60 is merely exemplary.

Figure 19:
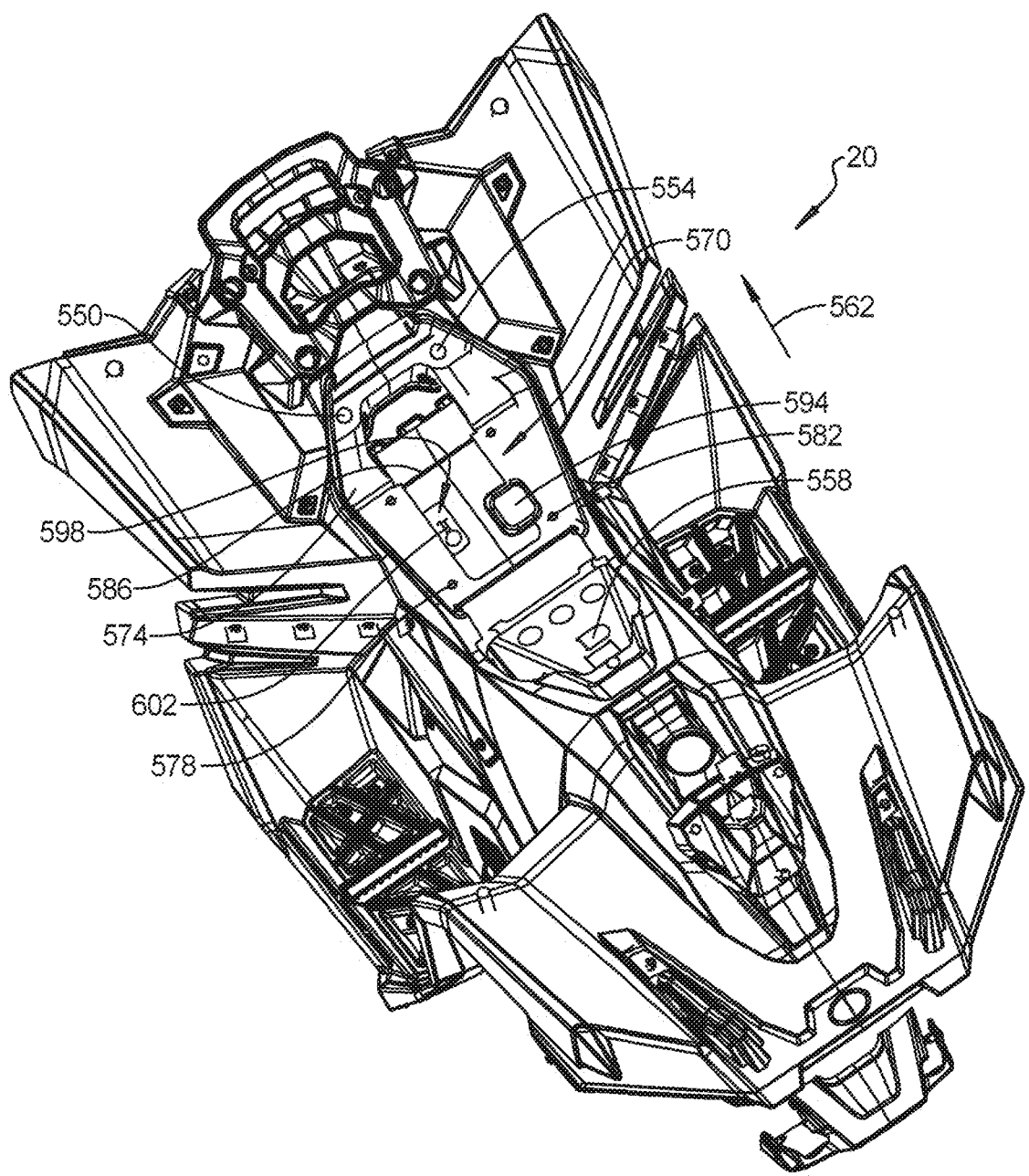
FIG. 19 is a top view of a body panel assembly of the vehicle of FIG. 1, with the seat assembly removed, according to various embodiments.
Figure 20:
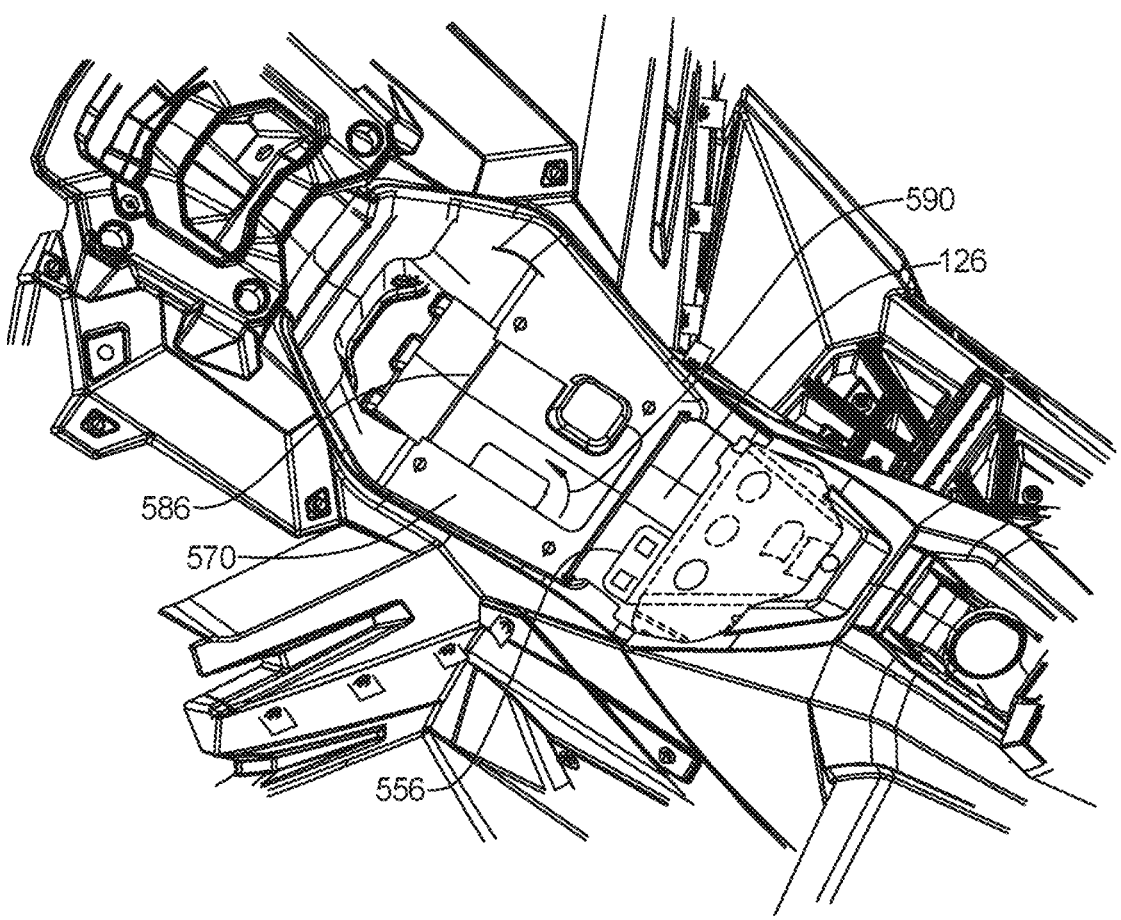
FIG. 20 is a detailed view of the body panel assembly of FIG. 19 with the seat assembly removed.

Upon removal of the seat assembly 56 from the ATV 20, with reference to FIG. 19 and FIG. 20, an access panel 570 may be revealed. The access panel 570 may be formed with a body panel assembly member 574 that may be incorporated with the rear body panel assembly 86 that includes the rear fender portions and/or the main body panel. The access panel 570 may be fixed relative to the body panel portion 574 with various features, such as connectors including a first connector 578 and a second connector 582. The two connectors 578, 582 may be appropriate connectors, such as twist-lock, pushpins, or the like. The panel member 570 may move relative to the body panel portion 574 due to a hinge portion 586. The hinge portion 586 may be a living hinge such that the panel 570 is formed substantially as one piece with the body panel portion 574. The living hinge 586 may be formed of a selected material or thickness to allow the panel door 570 to move relative to the body panel member 574, such as generally in the direction of arrow 590. The hinge 586 allows the panel door 570 to move in the direction of arrow 590 once the connectors 578, 582 are disengaged from holding portions, such as within frame 32 of the ATV 20, locking portions of the body panel 574, or the like.

The panel door 570 may be moved to allow access to various portions of the engine 126 and/or maintenance of the engine 126. For example, the door 570 may cover a brake fluid fill line or container. Further, the door 570 may include portions that allow it to cover portions relative to the door 570, such as a protrusion or hump 594. The protrusion 594 may be placed over the brake fluid fill cap to allow for positioning of the brake fluid fill reservoir and/or access to the reservoir. Further, removing the door 570 may allow access to a filter holding portion 596, such as an air filter holder. The air filter assembly 596 may be accessed through the opening created by moving the door assembly 570 generally in the direction of arrow 590. The air filter holder 596 may be accessed and removed to allow for replacement of the air filter of the engine assembly 126. Accordingly, the access panel 570 may be used to access various portions of the engine assembly 126 for maintenance or other features.

Further the access panel 570 may include one or more depressions or passages 598 formed therein. The depression 598 may hold or allow access to one or more components, such as one or more cables. In various embodiments, as illustrated, a cable 602 may be held in and/or accessed through the depression 598. The cable 602 may be connected to the battery 120. The cable 602 may be used for various purposes, such as outputting power for powering various accessory electronics, such as a global position system (GPS). Further, the cable 602 may be used as a charging cable to charge the battery 120. In various embodiments, the battery 120 may be charged when the ATV 20 is not in use, or will be stored for an extended period of time. Accordingly, the cable 602 may allow for easy access for providing power to the battery 120 during an extended period of non-use of the ATV 20, or any other appropriate period. Again, access to the cable 602 may be had by removing the seat assembly 56, as discussed above, from the ATV 20.

Accordingly, removing the seat assembly 56 from the ATV 20 may allow access to the engine assembly 126 and other features of the ATV 20 through the door 570 that is hingedly connected to the body panel 574. The access panel door 570 may be opened for accessing the engine assembly 126 for various purposes, such as maintenance of the engine assembly 126 and/or maintenance of other portions of the ATV 20. The access panel door 570, however, may maintain coverage of the engine assembly 120 and internal components of the ATV 20 even when the seat assembly 56 is removed, for example as discussed above to access the storage volume 506. Further, the access panel 570 allows for holding or ease of access to various other components, such as the cable 602. The cable 602 may allow for ease and efficient charging of the battery 120 and/or drawing power from the battery 120 for various components that are external to the ATV 20, such as a GPS assembly, cellular phone, or the like. The access panel 570, however, may be substantially un-removable from the body panel 574 and the ATV 20 such that the access panel 570 is not easily lost or removed and that the engine assembly 126 may remain covered from accidental access when removing the seat assembly 56.

With continuing reference to FIGS. 1-4 and additional reference to FIG. 21, FIG. 22, FIG. 23, and FIG. 24 the ATV 20 may include the engine 126. The engine 126 may be an internal combustion engine and is supplied with a fuel from a fuel tank 600. The fuel tank 600 may generally be housed or positioned below or covered by the front or forward body panel or hood panel 82. The front body panel 82 may have various depressions or channels, such as a channel region 604 and further channel regions, such as a forward channel region 606. The channel regions, such as the first channel region 604 and/or the second channel region 606 may assist in directing fuel off of the hood 82 and away from the engine 126 that is generally positioned below or covered by the hood 82.

Figure 4:
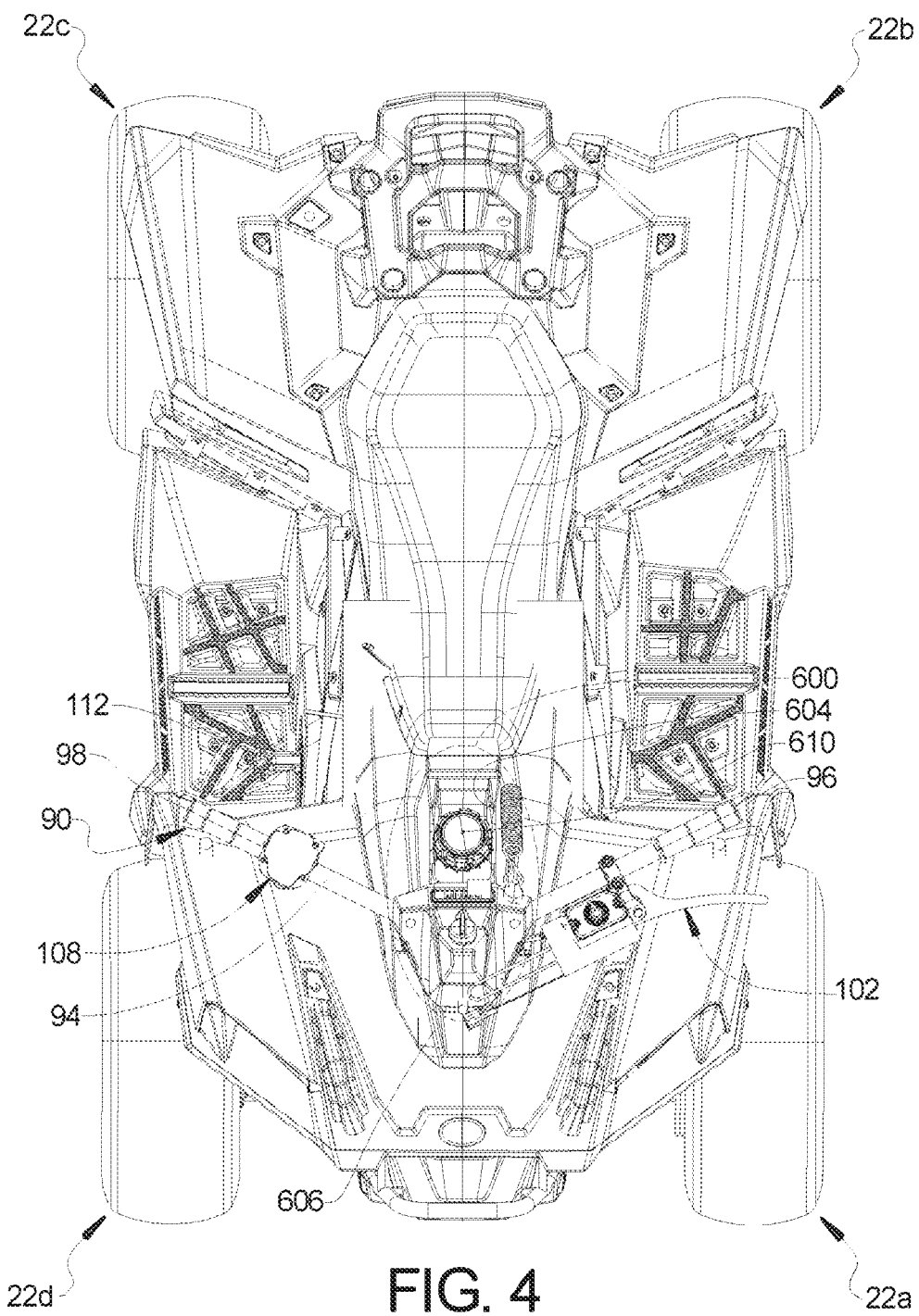
FIG. 4 is a top plan view of the vehicle of FIG. 1.
Figure 21:
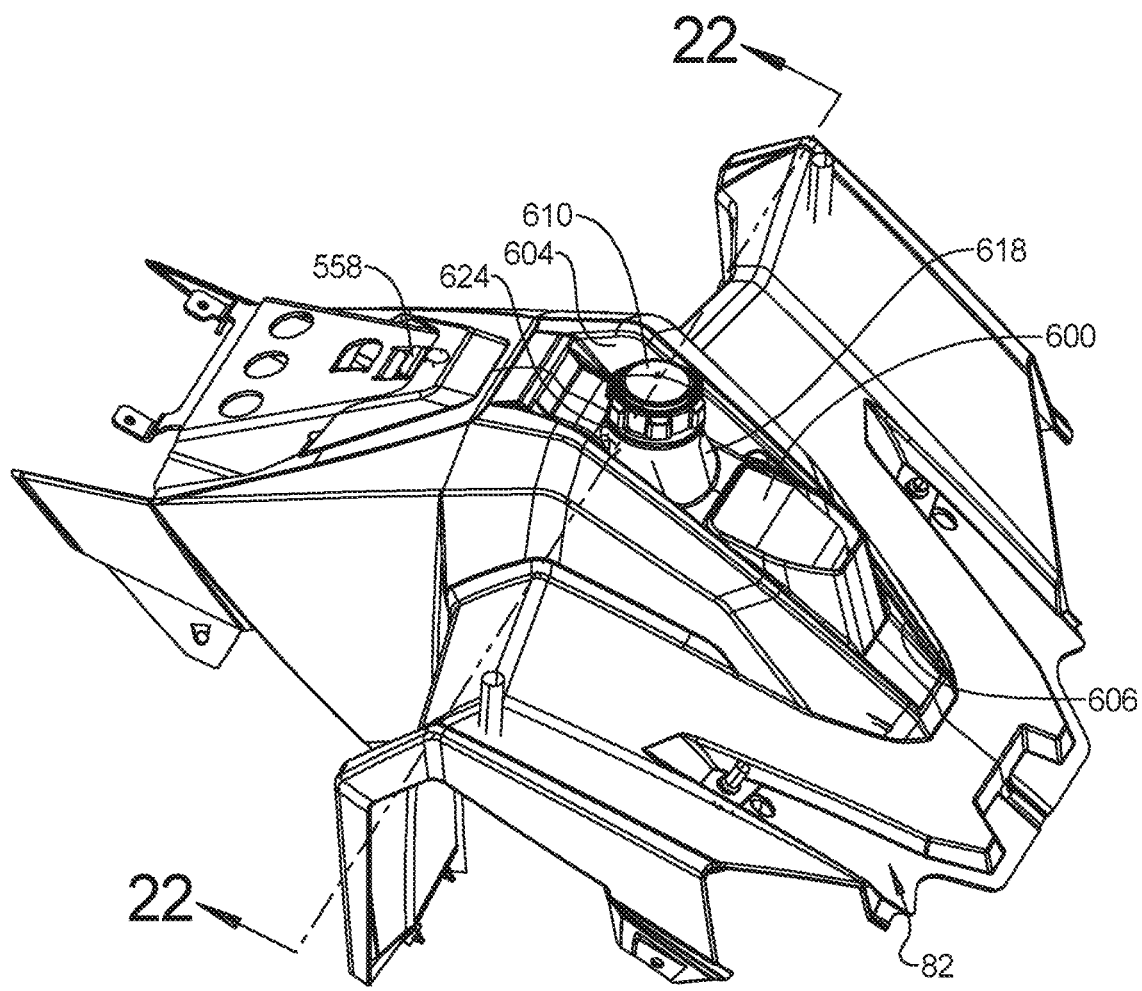
FIG. 21 is a detailed view of a hood body panel.

As illustrated in FIG. 4 and FIG. 21, a fuel fill cap 610 may be positioned at an end of a fuel fill neck, otherwise referred to as an opening, 614. The opening 614 may be also referred to as a fuel fill neck and may extend through a portion of the hood 82, such as through a projection or port 618. In various embodiments, the projection 618 may be spaced away from the tank 600 and the neck 614 (e.g. extend above or below a top of the fuel fill neck 614 and at a spaced radial distance). To assist in preventing or eliminating fuel from passing the projection 618 and/or between the projection 618 and the fuel fill neck 614, a sealing member 624 may be passed over an external thread 626 of a threaded region of the neck 614. The sealing member 624 may have an internal thread that is threadable to the external thread 626 on the neck 614.

The sealing member 624 may be tightened over the neck thread 626 and engage the projection 618, such as a top or outer surface 619, of the hood 82. The nut 624 may include an external surface 630 that is larger than the projection 618. Accordingly, if during filling of the tank 600 through the neck 614 with fuel, if the tank 600 overfills or if the fill nozzle is not engaged with the neck 614, fuel will spill over the outer surface 630 of the sealing nut 624 and into the channels 604 and/or 606. Thus, fuel or other fluids may pass away from the engine 126 that is covered by the hood 82, and not engage the engine or other portions below the hood 82, such as exhaust, transmission, or the like.

It is understood that the sealing nut 624 may also threadably engage the projection 618, if selected. For example, the projection 618 may include external threads that engage the internal threads of the nut 624. In this configuration, the sealing nut 624 may also provide a path or drainage away from a terminal end 6141 of the neck 614 and the engine 126 or other components covered by the hood 82.

Figure 22:
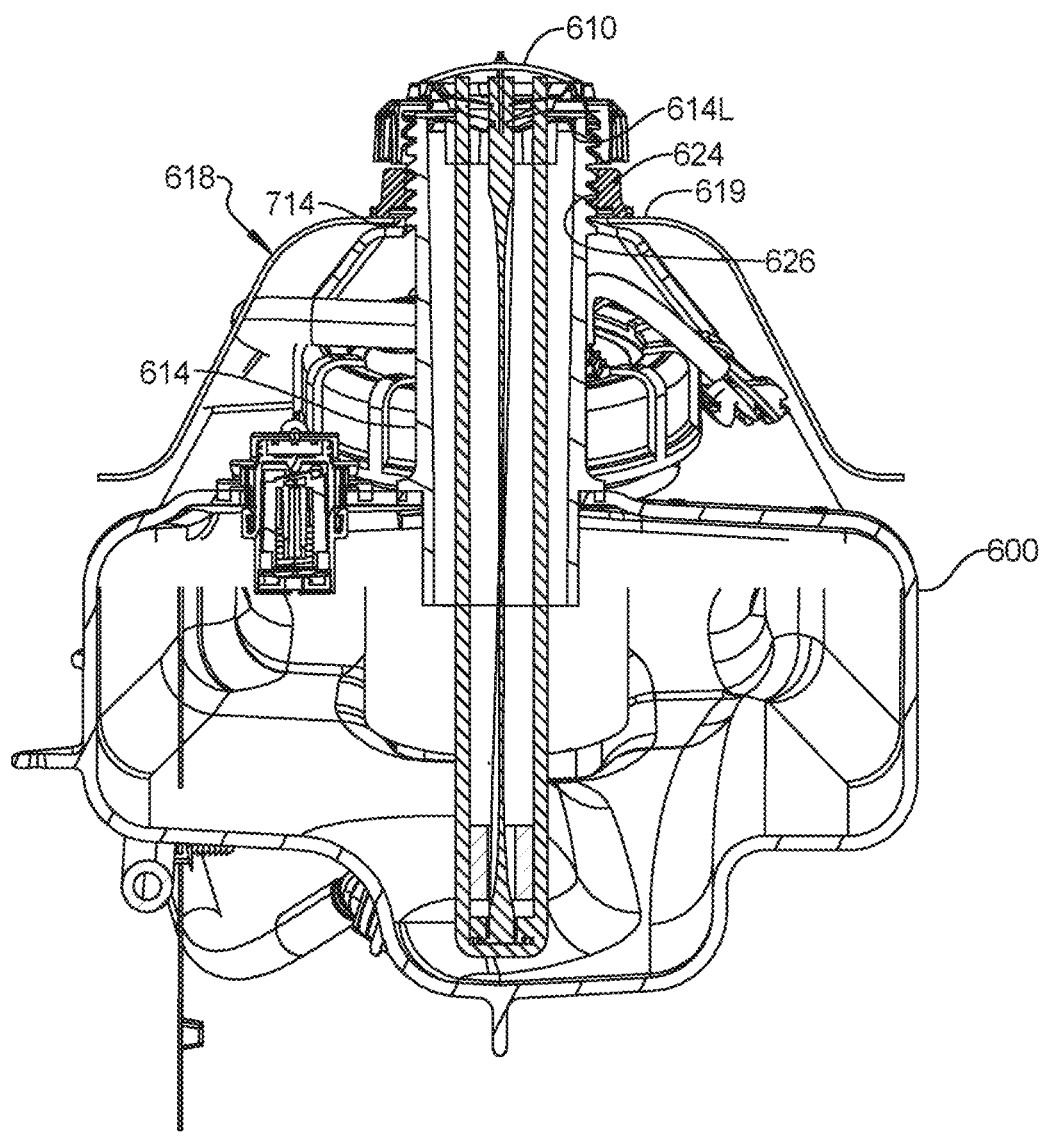
FIG. 22 is a cross-sectional view of the hood panel and fuel tank taken along line 22 of FIG. 21.
Figure 23:
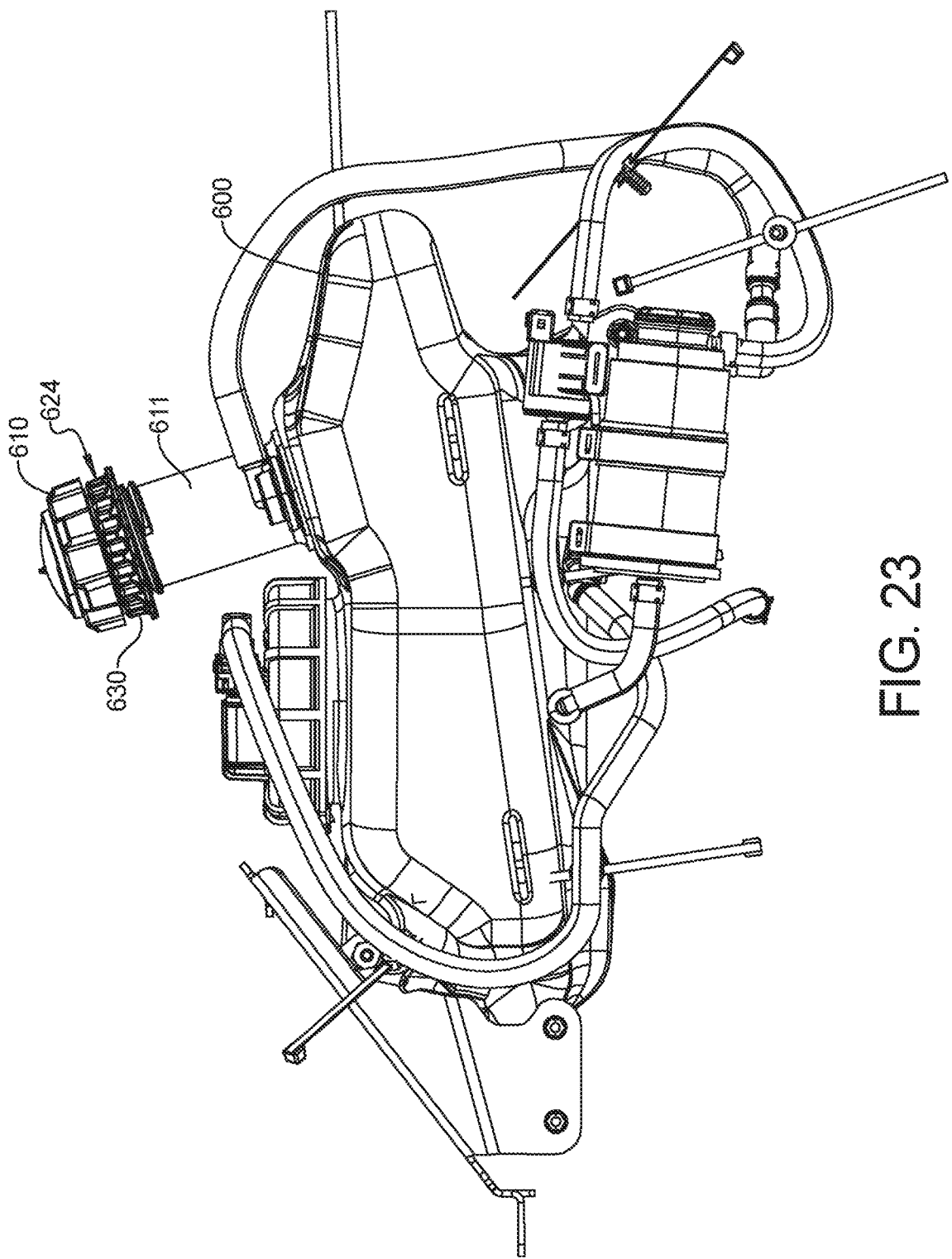
FIG. 23 is a view illustrating a fuel tank assembly and fill or neck cap and sealing member, according to various embodiments.
Figure 24:
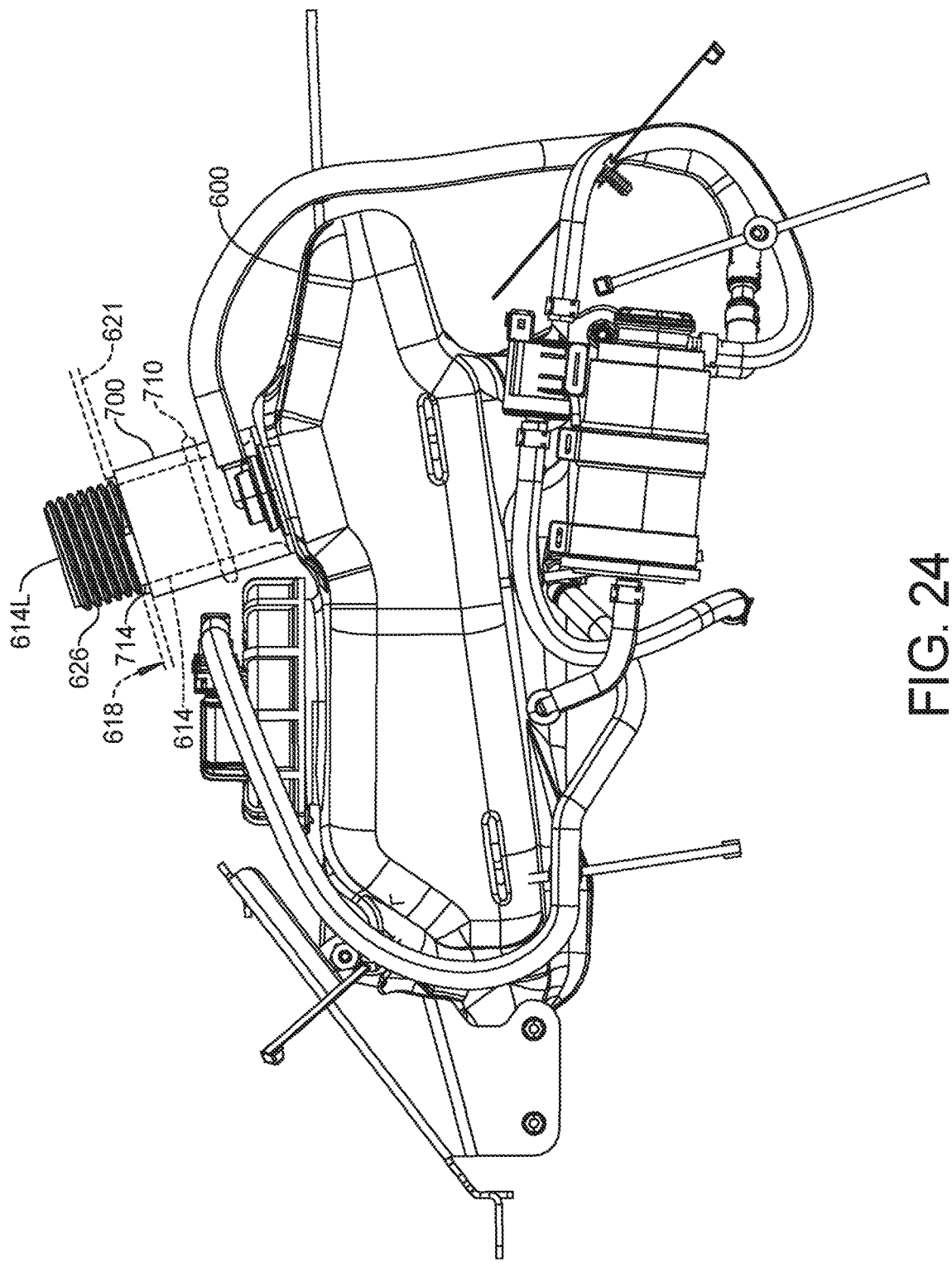
FIG. 24 is a view of a fuel tank and neck filler and a sealing member, according to various embodiments.

With continuing reference to FIGS. 21-23, and additional reference to FIG. 24, in various embodiments, a secondary and/or alternative sealing assembly or member 700 may be positioned between the hood body panel 82 and the fill neck 614. The sealing member 700 may be fixed or positioned relative to the fill neck 614. The sealing member 700 may be any appropriate material (e.g. a compressible and sealing material such as rubber) and configuration. In various embodiments, the sealing member 700 may generally extend from the tank 600 to engage (e.g. contact) a bottom surface 621 of the projection 618.

In various embodiments, the sealing member 700 may not extend and contact the tank 600. A projection or lip 710 may also be formed to extend from the fill neck 614. The sealing member 700 may be positioned on the lip 710 and/or between the lip 710 and the bottom surface 621 of the projection 618.

Regardless, however, the sealing member 700 may extend into the projection area 618 and at or near the opening or space 714. Thus, the sealing member 700 may seal any space, such as the space 714, between the neck 614 and the projection 618 to limit eliminate fluid passage past the projection 618 and around the neck 614. The sealing member 710 may be used in combination with or in place of the sealing ring 624.

The sealing member 700 may be formed of a selected material. The selected material of the sealing member 700 may be a compressible material. In various embodiments, the sealing member 700 may be formed of a foam, such as a polyurethane foam. The sealing member 700 may be a closed cell foam. The sealing member 700 may be compressed into or near the open area 714 and the tank 600 and/or the ledge 710.

Accordingly, the sealing member 700 may also resist or eliminate material, such as fuel or other fluids, to pass between the hood member 82, such as with a projection 618, and the fuel neck 614. The sealing member 700 fills the space 714 and reduces or eliminates the fluid that may pass between the fuel neck 614 and the projection 618. Any fluid that does not enter the fuel neck 614, therefore, may enter the channel 604 and/or 606 to be directed away from the ATV 20.

Accordingly, in various embodiments, the various internal components of the ATV 20, such as the engine 126, transmission, or other components such as an exhaust, may be protected from fluids passing between the fill neck 614 and the hood member 82. The sealing nut 624 may be passed over the fill neck 614 and provide a cover or umbrella that extends over the projection 618. In addition and/or alternatively thereto, the sealing member 700 may be positioned below the projection 618 and fill the space 714 that may otherwise and/or in addition be covered by the sealing nut 624. Accordingly, the components covered by the hood member 82 may be protected from fluids that would otherwise pass around the fuel neck 614 and/or the cap 600.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A powered vehicle operable to be ridden by a rider, comprising:
    a frame assembly;
    at least one ground engaging member;
    a power supply supported by the frame assembly and configured to drive the at least one ground engaging member;
    a body panel fixed to the frame assembly and covering at least a portion of the power supply;
    a fill neck having an extending portion that extends through the body panel wherein an external thread is formed on an exterior surface of the extending portion; and
    a sealing member having an internal surface that engages the external thread of the fill neck to seal to the fill neck to direct a flow of fluid away from the fill neck and over an outer surface of the body panel.

2. The vehicle of claim 1, wherein the sealing member includes an annular member having an internal thread formed on the internal surface and an external directing surface;
    wherein the annular member is threaded to the external thread of the fill neck and the external directing surface extends away from the fill neck and over the body panel.

3. The vehicle of claim 2, wherein the sealing member is configured to simultaneously engage both the fill neck and the body panel.

4. The vehicle of claim 3, further comprising:
    a cap;
    wherein the cap includes internal threads to engage the external thread of the fill neck.

5. The vehicle of claim 3, wherein the power supply is a motor.

6. The vehicle of claim 5, wherein the sealing member includes a fluid impervious material engageable between the outer surface of the body panel and the motor to limit flow of a fluid past the body panel toward the motor.

7. The vehicle of claim 1, further comprising:
    a throttle actuation assembly having an engageable member to operate a throttle associated with the power supply, wherein the throttle actuation assembly further comprises,
    a body portion; and
    an axle member extending from the body portion and having at least one spline formed on an exterior of the axle member;
    wherein the engageable member has a first detent and a second detent.

8. The vehicle of claim 7, wherein the engageable member is moveable relative to the axle member to selectively engage either the first detent or the second detent with the at least one spline to select a respective first position or a second position of the engageable member relative to the body portion.

9. The vehicle of claim 7, wherein the engageable member is moveable by the rider during operation of the vehicle.

* * * * *